(12) United States Patent
Beard et al.

(10) Patent No.: US 9,491,361 B2
(45) Date of Patent: Nov. 8, 2016

(54) LORENTZ ACTUATOR MECHANISM CALIBRATION

(71) Applicant: Apple Inc., Cupertino, CA (US)

(72) Inventors: David C. Beard, Los Gatos, CA (US); Richard J. Topliss, Campbell, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 14/537,784

(22) Filed: Nov. 10, 2014

(65) Prior Publication Data

US 2016/0070270 A1    Mar. 10, 2016

Related U.S. Application Data

(60) Provisional application No. 62/047,480, filed on Sep. 8, 2014.

(51) Int. Cl.
| | | |
|---|---|---|
| *G05D 3/14* | (2006.01) | |
| *H04N 5/232* | (2006.01) | |
| *G02B 27/64* | (2006.01) | |
| *H04N 5/225* | (2006.01) | |

(52) U.S. Cl.
CPC ........ *H04N 5/23287* (2013.01); *G02B 27/646* (2013.01); *H04N 5/2257* (2013.01); *H04N 5/23212* (2013.01)

(58) Field of Classification Search
CPC .... B25J 9/1633; F15B 15/2861; H02K 7/06; H02K 29/03; H02K 29/08; H02K 41/031; H02K 7/003; H02K 26/00; H02K 49/106; H04N 5/23264; G01B 7/023; G01B 7/087; G01D 5/145; G05D 3/14
USPC ................. 318/119, 135, 687, 686
See application file for complete search history.

(56) References Cited

U.S. PATENT DOCUMENTS

| | | | | |
|---|---|---|---|---|
| 4,659,969 A | * | 4/1987 | Stupak, Jr. | ............ H01F 7/1844 |
| | | | | 310/30 |
| 4,731,579 A | * | 3/1988 | Petersen | .............. G01D 5/2006 |
| | | | | 324/207.24 |
| 5,844,140 A | | 12/1998 | Seale | |
| 6,249,418 B1 | * | 6/2001 | Bergstrom | ................ F01L 9/04 |
| | | | | 361/152 |
| 7,866,829 B2 | | 1/2011 | Takeuchi et al. | |
| 7,936,144 B2 | | 5/2011 | Vig et al. | |

FOREIGN PATENT DOCUMENTS

WO          201461907          4/2014

* cited by examiner

*Primary Examiner* — Bentsu Ro
(74) *Attorney, Agent, or Firm* — Robert C. Kowert; Meyertons, Hood, Kivlin, Kowert & Goetzel, P.C.

(57) ABSTRACT

An actuator module which includes a Hall sensor, configured to generate output signals indicating a displacement of a mobile component by a Lorentz actuator mechanism, can be calibrated to remove corruption of the output signals due to magnetic fields generated by a coil assembly of the actuator mechanism. Such calibration can include tracking and manipulating one or more of current strength, output signal voltage strength, and mobile component displacement to establish a relationship between output signal voltage and current applied to the coil assembly. The relationship can be used to generate, for a given generated output signal voltage and applied current strength, an offset signal voltage which can be subtracted from the voltage strength of the output signal to determine a corrected output signal, independent of coil assembly corruption, which indicates a displacement of the mobile component.

20 Claims, 24 Drawing Sheets

LORENTZ ACTUATOR MECHANISM CALIBRATION

PRIORITY INFORMATION

This application claims benefit of priority of U.S. Provisional Application Ser. No. 62/047,480 entitled "Lorentz Actuator Mechanism Calibration" filed Sep. 8, 2014, the content of which is incorporated by reference herein in its entirety and for all purposes.

BACKGROUND

1. Technical Field

This disclosure relates generally to control of the motion of mobile components, relative to static components, based at least in part upon a linear actuator mechanism using Lorentz forces, also referred to herein as a Lorentz actuator mechanism.

2. Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation or disturbance by adjusting location of the optical lens on the X and/or Y axis in an attempt to compensate for unwanted motion of the lens.

Some small form factor cameras may incorporate an autofocus (AF) mechanism whereby the object focal distance can be adjusted to focus an object plane or field in front of the camera at an image plane to be captured by an image sensor (also referred to herein as a photosensor). In some such autofocus mechanisms, the optical lens is moved as a single rigid body along the optical axis (referred to as the Z axis) of the camera to refocus the camera. In addition, high image quality is easier to achieve in small form factor cameras if lens motion along the optical axis is accompanied by minimal parasitic motion in the other degrees of freedom, for example on the X and Y axes orthogonal to the optical (Z) axis of the camera. Thus, some small form factor cameras that include autofocus mechanisms may also incorporate optical image stabilization (OIS) mechanisms that may sense and react to external excitation or disturbance by adjusting location of the optical lens on the X and/or Y axis in an attempt to compensate for unwanted motion of the lens.

There is a strong desire, for a given size of camera, to fit bigger lenses and image sensors to improve image quality, and hence there is a desire to reduce the size of components such as actuator mechanisms. However, some small-sized components, including various components included in actuator mechanisms, can be relatively complex to assemble and can be vulnerable to failure, based at least in part upon small size and complexity of various components.

In addition, to implement adjustments of the location of the optical lens, for one or more of AF or OIS mechanisms, the position of the optical lens may need to be determined, and adjustments to the position ("displacements") caused by commands to actuator mechanisms can be monitored, and the commands adjusted, in order to adjust the displacement of the optical lens as desired. As a result, in order to accurately control displacements of a mobile component in one or more various directions, such as accurately controlling displacement of an optical lens in a Z axis for autofocusing, controlling displacement of an optical lens in an X axis, Y axis, etc. for optical image stabilization, etc., it can be important for a device including an actuator mechanism configured to cause such displacement to accurately determine a displacement of the optical lens caused by commanded adjustments to the actuator mechanism.

SUMMARY OF EMBODIMENTS

Some embodiments provide an actuator module which includes a Hall sensor, configured to generate output signals indicating a displacement of a mobile component by a Lorentz actuator mechanism, can be calibrated to remove corruption of the output signals due to magnetic fields generated by a coil assembly of the actuator mechanism. Such calibration can include tracking and manipulating one or more of current strength, output signal voltage strength, and mobile component displacement to establish a relationship between output signal voltage and current applied to the coil assembly. The relationship can be used to generate, for a given generated output signal voltage and applied current strength, an offset signal voltage which can be subtracted from the voltage strength of the output signal to determine a corrected output signal, independent of coil assembly corruption, which indicates a displacement of the mobile component.

Figure 1:
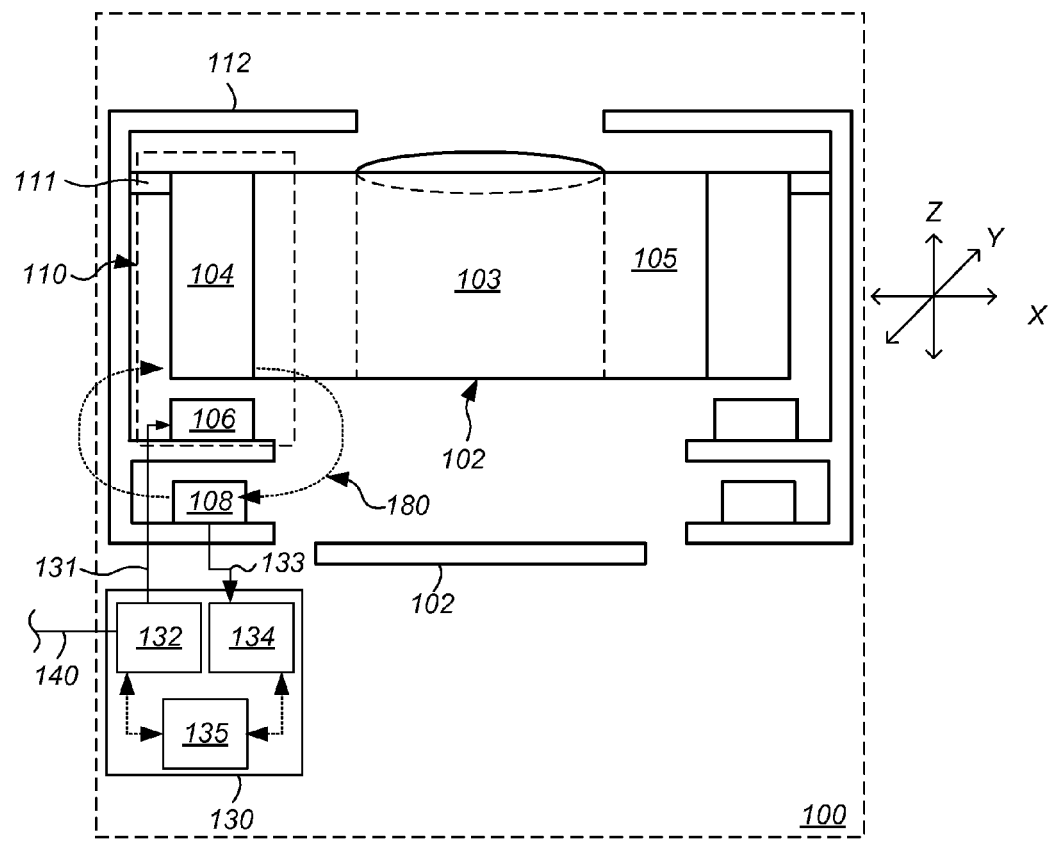
FIG. 1 illustrates an actuator module, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Some embodiments provide an apparatus for controlling the motion of a mobile component relative to a static component. The apparatus can include a linear actuator which controls the motion of the mobile component based at least in part upon Lorentz forces. Such a linear actuator can be referred to herein as a Lorentz actuator mechanism. In some embodiments, at least the mobile component is included in a camera component, such that the actuator mechanism controls the motion of an optics carrier which itself includes one or more optics components, which can include one or more optical lenses, relative to one or more image sensors.

In some embodiments, an apparatus for controlling the motion of a mobile component relative to a static component, comprises one or more magnets coupled to the mobile component and a coil assembly, also referred to herein interchangeably as a "coil element", "coil actuator", etc. physically coupled to the static component in a magnetic field of at least one of the magnets and electrically coupled to a power source. The coil assembly is configured to adjust a position of the mobile component, which can result in causing a displacement of the mobile component, relative to the static component, based at least in part upon Lorentz forces. The coil assembly comprises a set of conductor elements that form a coil structure. In some embodiments, the coil assembly comprises a voice coil motor which includes a wound coil of one or more conductor elements. The coil assembly is configured to generate the Lorentz forces based at least in part upon an electrical current applied to the coil assembly.

In some embodiments, the mobile component comprises an optics carrier comprised in a camera device and comprising an optics component, and the actuator mechanism which comprises the magnet and coil assembly is configured to displace the optics carrier, relative to an image sensor in the camera device along one or more directional axes. For example, the actuator mechanism can displace the optics carrier along one or more axes which are orthogonal to the optical axis to stabilize the optics component. In another example, the actuator mechanism can displace the optics carrier along one or more axes which are parallel to the optical axis to adjust a focus of the optics component. The optics component can include one or more optical lenses.

In some embodiments, an actuator mechanism is configured to cause a particular magnitude of displacement of a mobile component. The actuator mechanism can determine a particular displacement of the mobile component from an equilibrium position, and adjust strength of applied current to the coil assembly to adjust the displacement. Such adjusting of applied current can include a control feedback loop, where displacement data is utilized to adjust applied current until the sensed displacement of the mobile component approximates a particular desired displacement within one or more displacement margins.

In some embodiments, an actuator module includes a Hall Effect sensor, also referred to herein as a "Hall sensor", which is configured to generate an output signal based at least in part upon a magnetic field sensed at the Hall sensor. In some embodiments, a Hall sensor is configured to sense a portion of a magnetic field which is in a particular directional axis and generate output signals based at least in part upon strength of a magnetic field in the particular directional axis.

FIG. 1 illustrates an actuator module, according to some embodiments. Actuator module 100 includes a static component, a mobile component, an actuator mechanism which can adjustably position (herein "displace") the mobile component relative to the static component, Hall sensors configured to generate output signals which indicate displacement of the mobile component, and a controller module which can control application of electrical current to a coil assembly of the actuator mechanism based at least in part upon a determination of the mobile component displacement based on the Hall sensor output signals.

Actuator module 100 includes a static component 112 and a mobile component 102 which is configured to be displaced, relative to at least the static component 112. In some embodiments, the static component includes a housing of the actuator module 100. In some embodiments, actuator module 100 is comprised in a camera device. For example, in the illustrated embodiment, mobile component 102 can comprise an optics carrier 105 in which one or more optics components 103 are mounted, and mobile component 102 can be configured to be displaced, relative to an image sensor 114, to control one or more of optical image stabilization, autofocus, etc. As shown, mobile component 102 can be coupled to the static component 112 via one or more spring assemblies 111 which can at least partially restrict a range of motion of the mobile component 102 in module 100.

Actuator module 100 includes one or more actuator mechanisms 110 which can displace the mobile component 102, relative to static component 112, based at least in part upon Lorentz forces. Actuator mechanism 110 includes a magnet 104 and a coil assembly 106, where the coil assembly is electrically coupled to a power source 140 via at least an electrical connection 131. An electrical current can be applied to the coil assembly 106, via power source 140, and the current applied to the coil assembly 106 can cause Lorentz force generation which causes the magnet 104 and coil assembly 106 to move in one or more particular directions, relative to each other. As shown, magnet 104 is included in the mobile component 102 and the coil assembly 106 is included in the static component 112; as a result, generation of Lorentz forces based on electrical current applied to the coil assembly 106 can cause the mobile component 102 to be displaced, relative to the static component 112.

Actuator module 100 includes a controller device 130, which can be implemented by one or more computer systems, which is configured to control displacement of the mobile component 102 in the module 100. Device 130 includes a controller module 135 which is configured to generate current command signals to a power supply module 132, where the current command signals can command a power supply module 132, also referred to herein as a "current driver", to apply electrical current to coil assembly 106 via connection 131.

Actuator module 100 includes a Hall sensor 108 which is coupled to the static component 112 and is configured to generate output signals based at least in part upon a magnetic field strength, in one or more particular directions, at the Hall sensor 108. Output signals, as referred to herein, can include one or more output signals having particular voltages, where the voltages of a given output signal is associated with strength of a magnetic field, in one or more directions, sensed at the sensor 108. In the illustrated embodiment, the Hall sensor 108 is configured to sense a magnetic field strength in the Z directional axis, such that a magnetic field 180, generated by magnet 104, which at the Hall sensor 108 is entirely directed in the X axis and Y axis can result in the Hall sensor 108 generating an output signal having a minimum voltage. The illustrated mobile component 102 can be positioned at an equilibrium position, which can be at least partially based upon spring forces exerted by spring assemblies 111 on the mobile component 102, gravity, etc. where the magnetic field 180 generated by magnet included in component 102 is directed approximately parallel to the X and Y axis and has a minimum strength in the Z axis at the Hall sensor 108.

In some embodiments, the coil assembly 106 is configured to displace the mobile component 102 in the X axis or Y axis but not the Z axis. Such a coil assembly 106 can be used for optical image stabilization of optics component 103. As the mobile component 102 is displaced in the X axis or Y axis, the magnetic field 180 generated by magnet 104 can be displaced along with the magnet 104, so that portions of the magnetic field 180 sensed at Hall sensor 108 are at least partially directed in the Z axis. As the displacement of the component 102 increases from the equilibrium position, the strength of field 180 directed in the Z axis, as sensed at Hall sensor 108, can increase. As a result, Hall sensor 108 can generate output signals which have voltages which increase with the strength of the magnetic field 180 in the Z axis at sensor 108.

Output signals generated by Hall sensor 108 can be transmitted to a Hall sensor module 134, also referred to herein as a Hall sensor driver, of device 130, via a connection 133. In some embodiments, controller module 135 can use one or more portions of the output signal generated by the Hall sensor 108, including the voltage of the signal, to determine the displacement of the mobile component 102 from the equilibrium position along one or more of the X axis or Y axis. Controller module 135 may make such a determination based at least in part upon both the voltage of the output signal generated by the Hall sensor 108 and the strength, also referred to herein as "amperage", of the electrical current applied to coil assembly 106.

In some embodiments, controller module 135 adjusts the strength of the electrical current applied to coil assembly 106 based at least in part upon the determined displacement of the mobile component 102. For example, where a controller module 102 generates a command signal to current driver 132 to apply current to coil assembly 106 to cause a particular displacement of component 102, and the module 135 determines, based at least in part upon the voltage of the output signal generated by sensor 108, that the component 102 has been excessively displaced by a certain magnitude, control module 135 can generate new command signals to module 132 to reduce the applied current to compensate. In some embodiments, controller module 135 determines displacement of mobile component 102 based at least in part upon both the output signal generated by the Hall sensor and the electrical current applied to the coil assembly 106. In some embodiments, module 135 generates a command to current driver to apply a particular strength of electrical current to coil assembly 106, based at least in part upon a determination that the particular strength of the applied current will result in a particular displacement of the mobile component 102 from the equilibrium position.

Lorentz Actuator Coil Assembly Corruption of Hall Sensor Output Signals

In some embodiments, multiple magnetic fields are generated in the proximity of the Hall sensor, such that the voltage of an output signal generated at the Hall sensor is based upon multiple magnetic field sources. As a result, the output signals generated by the Hall sensor may not accurately indicate the displacement of the mobile component. For example, when electrical current is applied to the coil assembly, a magnetic field can be generated at the coil assembly, based at least in pat upon the applied current. The strength of the magnetic field can be based on the strength of the applied current. In some embodiments, where the Hall sensor is located within certain proximity of the coil assembly, the magnetic field generated at the coil assembly can be sensed at the Hall sensor, in addition to a magnetic field generated by the magnet included in the mobile component. Because the magnetic field sensed at the Hall sensor is affected by both mobile component displacement and applied electrical current to the coil assembly, the applied electrical current can result in the sensed magnetic field, and thus the generated output signal, being "corrupted" by the applied electrical current, such that the voltage of the generated output signal does not accurately indicate a displacement of the mobile component which includes the magnet. Such corruption is referred to herein as "coil assembly corruption" of the output signal.

Figure 2A:
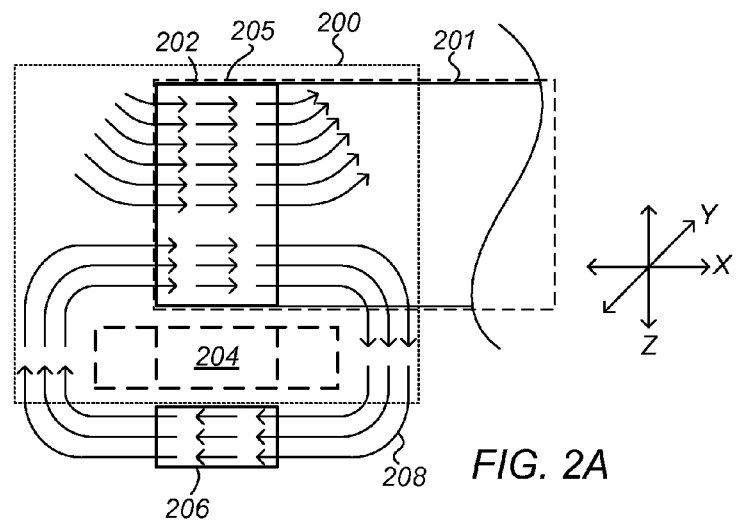
FIG. 2A-C illustrate magnetic fields generated by various components of a Lorentz actuator mechanism and sensed at a Hall sensor located proximate to the coil assembly of the actuator mechanism, according to some embodiments.
Figure 2B:
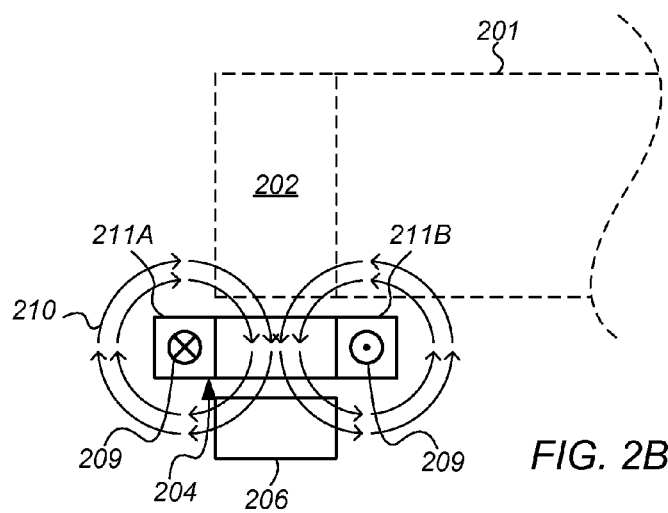
Figure 2C:
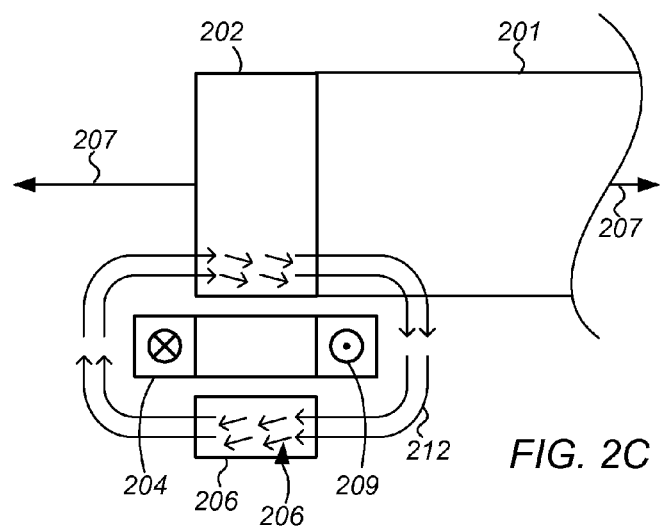

FIG. 2A-C illustrate magnetic fields generated by various components of a Lorentz actuator mechanism and sensed at a Hall sensor located proximate to the coil assembly of the actuator mechanism, according to some embodiments. The actuator mechanism and Hall sensor illustrated in FIG. 2A-C can be included in the actuator mechanism and Hall sensor included in any of the other illustrated embodiments.

Actuator mechanism 200 includes a magnet 202 and a coil assembly 204. Hall sensor 206 is located proximately to coil assembly 204. As shown in FIG. 2A-C, magnetic fields can be generated by both the magnet 202 and the coil assembly 204, and strengths of one or both magnetic fields can be sensed by the Hall sensor 206, which can result in an output signal, generated by the Hall sensor, which includes a voltage having a strength which is based on sensed magnetic field strength, which represents a magnetic field strength at the Hall sensor which is caused by both the magnet and the coil assembly. As a result, determining the displacement of a mobile component, to which the magnet 202 is coupled, from an equilibrium position 205 based at least in part upon the voltage strength of the output signal generated by the Hall sensor 206, can be at least partially corrupted by a magnetic field generated by the coil assembly.

FIG. 2A illustrates the magnetic field 208 generated by the magnet 202, where a portion of the field 208 at the Hall sensor 206 is primarily in the X axis and Y axis, and the strength of the field 208 at the sensor 206 in the Z axis is minimal. In some embodiments, sensor 206 can sense, and thus generate output signals based upon, magnetic field strength at the Hall sensor 206 which is directed in the Z axis direction. In the illustrated embodiment, where the strength of field 208 in the Z direction is minimal and is the sole magnetic field sensed at sensor 206, based at least in part upon the magnet 202 being positioned directly in line with sensor 206 in the Z axis, the output signal generated by sensor 206 can be minimized, absent, etc. The illustrated positioning of mobile component 201 relative to sensor 206, where the strength of field 208 in the Z direction at sensor 206 is minimized, can correlate with the mobile component 201 being positioned at an equilibrium position 205, relative to at least the sensor 206. In some embodiments, where magnet 202 is displaced 207 in the X direction, Y direction, etc., which can be based at least in part upon Lorentz forces generated at coil assembly 204, the magnetic field 208 can be displaced in the X axis, Y axis, etc. As the field 208 is displaced from the illustrated position, the strength of the field in the Z direction at sensor 206 can increase from the illustrated minimum, thereby resulting in an increase in the voltage strength of the output signal generated by sensor 206. In some embodiments, the equilibrium position 205 of the mobile component 201 to which the magnet 202 is coupled is associated with an absence of applied electrical current at coil assembly 204.

FIG. 2B illustrates the magnetic field 210 generated by the coil assembly 204 when a current 209 is applied to the coil assembly. As shown, the current through the right-most portion 211B of the coil assembly is directed out of the figure, and the current through the left-most portion 211A of the coil assembly 204 is directed into the figure. As such, where the Hall sensor 206 is positioned between the left-most and right-most portions 211A-B of the coil assembly 204 on the X axis and Y axis, the magnetic field 210 generated at coil assembly portions 211A-B based on the applied current 209 can have a nonzero strength in the Z direction at the Hall sensor 206, such that the Hall sensor 206 senses a nonzero strength of the field 210 in the Z direction and thus generates a output signal having a voltage strength which is based at least in part upon the sensed Z direction strength of the field 210 generated by coil assembly 204. In the illustrated embodiment, for example, the portion of field 210 sensed at sensor 206 is at least partially directed in a negative-Z direction, and thus has a nonzero strength in the Z direction at sensor 206. As a result, an output signal can be generated by sensor 206 based at least in part upon the magnetic field 210 generated by coil assembly 204. In some embodiments, the strength of field 210 is based at least in part upon the strength of the applied electrical current 209. For example, the Z-strength of the magnetic field 210 at Hall sensor 206 can have a direct relationship with the strength of the applied electrical current 209.

FIG. 2C illustrates a magnetic field 212 which represents a combination of fields 208 and 210, where an electrical current 209 is applied to coil assembly 204 to cause magnet 202 to be displaced 207 from an equilibrium position 205 based on Lorentz forces generated from the electrical current 209. As the magnet 202 is displaced, the Z-direction strength of field 208 sensed at sensor 206 can change. In addition, the Z-direction strength of field 210 sensed at sensor 206 can be a nonzero strength, based at least in part upon the applied electrical current 209 which causes the magnet to be displaced 207. The fields 208 and 210, represented by field 212, can interfere so that the magnetic field strength sensed at sensor 206, and thus the voltage strength of the output signal generated by same, are not based solely upon the displacement 207 of magnet 202 but is also based on the strength of current 209. In some embodiments, the voltage strength of the output signal generated by sensor 206 can be substantially (e.g., up to 20%) caused by coil assembly corruption via the coil assembly field 210, rather than caused by displacement of the magnet 202 which generates field 208.

In order to accurately control displacement of mobile component 201 via applied electrical current to the coil assembly 204 and voltage strength of output signals generated by Hall sensor 206, processing of the output signal which accounts for, and corrects for, the magnetic field 210 generated by coil assembly 204 can enable determination of a corrected output signal which represents an estimated voltage strength of an output signal which would be generated by sensor 206 if only field 208 were sensed at sensor 206, thereby enabling accurate determination of the displacement 207 of magnet 202 based on the corrected signal.

Figure 3:
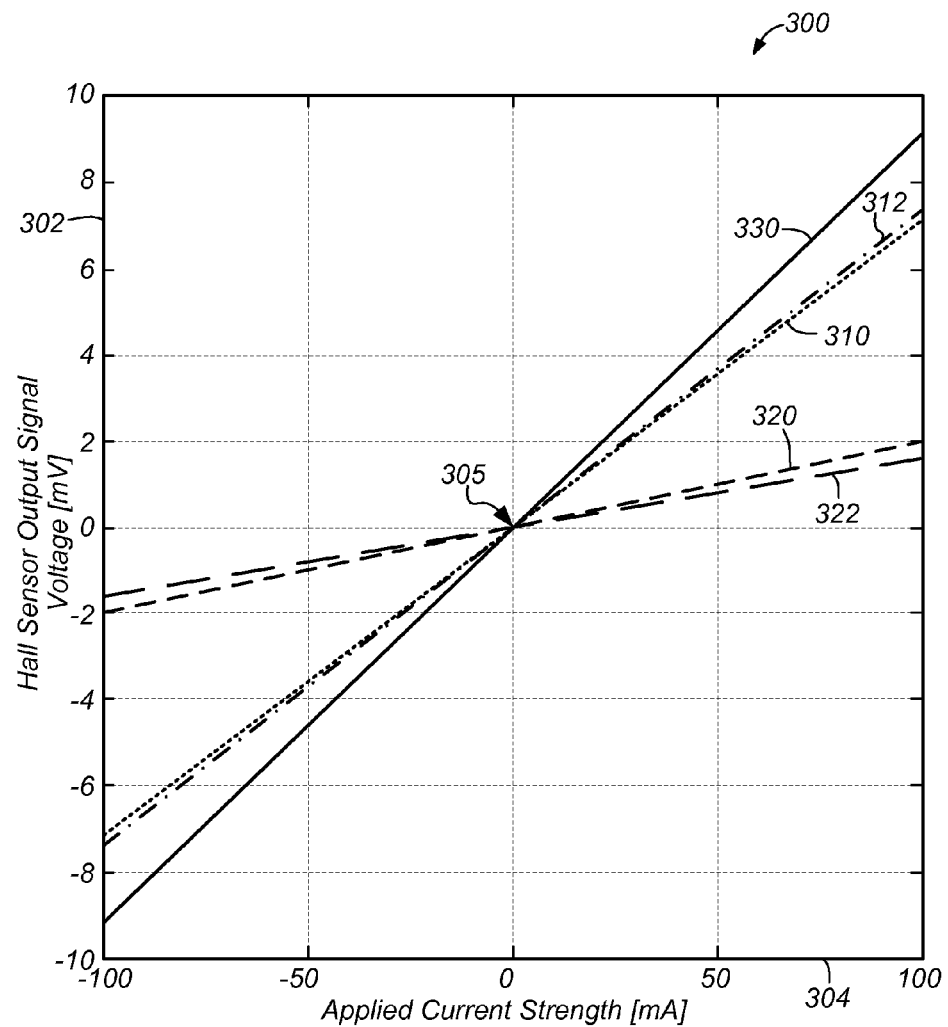
FIG. 3 illustrates a graphical relationship between a portion of a output signal of a Hall sensor which is caused by displacement of a mobile magnet and another portion of the output signal which is caused by the coil assembly, as well as approximations of same, according to some embodiments.

FIG. 3 illustrates a graphical relationship between a portion of an output signal of a Hall sensor which is caused by displacement of a mobile magnet and another portion of the output signal which is caused by the coil assembly, as well as approximations of same, according to some embodiments. The illustrated relationship can be a relationship between current and output signal voltage for a Hall sensor and actuator mechanism illustrated in any of the other illustrated embodiments in any of the other figures.

In some embodiments, Hall sensor output signals and electrical current applied to a coil assembly are in a particular direct relationship. In the illustrated embodiment, for example, the voltage strength 302 of an output signal generated by a Hall sensor has a direct linear relationship to the strength of the electrical current 304 applied to a coil assembly, such that an absence of output signal corresponds with an absence of applied electrical current, as shown at origin 305.

In some embodiments, the voltage strength of an output signal generated by a Hall sensor can have a relationship with a displacement of a mobile component which comprises a magnet, such that strength of the magnetic field, generated by the magnet, in a particular direction at the Hall sensor varies with the displacement. In the illustrated embodiment, curve 310 illustrates a relationship between applied electrical current strength 304 and a output signal 302 generated by the Hall sensor, where the voltage strength of the signal on curve is based on strength of a magnetic field generated by a displaced mobile component magnet in a certain direction (e.g., the Z direction). In the illustrated embodiment, the output signal caused by displacement of the mobile component magnet has a linear relationship with applied electrical current, so that curve 310 is a linear curve which intersects the origin 305.

In some embodiments, the magnetic field sensed at the Hall sensor is "corrupted" by another magnetic field generated by the coil assembly due to the applied electrical current, so that the output signal generated by the Hall sensor is a result of both the mobile component magnet displacement and the application of current to the coil assembly. For example, curve 320 illustrates a relationship between applied electrical current strength 304 and a voltage strength of output signal 302 generated by the Hall sensor, where the voltage strength on curve 320 indicates strength of a magnetic field generated by the coil assembly in a certain direction (e.g., the Z direction). In the illustrated embodiment, the voltage strength of the output signal which is caused by the coil assembly field has a linear relationship with applied electrical current, so that curve 320 is a linear curve which intersects the origin 305.

Because the Hall sensor, in some embodiments, is unable to distinguish between separate magnetic fields generated by the mobile component magnet and the coil assembly, a Hall sensor generates an output signal which represents the effects of both the coil assembly and the displaced magnet on the magnetic field sensed at the Hall sensor. As shown in the illustrated embodiment, curve 330 illustrates a relationship between applied electrical current strength 304 and an output signal 302 generated by the Hall sensor, where the voltage strength of the signal is based on both the coil assembly magnetic field and displacement of a mobile component magnet caused by Lorentz forces generated at the coil assembly due to the applied current.

Due to the inability of a Hall sensor to distinguish between the coil assembly magnetic field and the magnet-generated magnetic field, the voltage strength at curve 330, which can be the actual strength of an output signal generated by the Hall sensor, represents the effects of both mobile component displacement and coil assembly magnetic field generation. For example, as shown, when 100 mA of electrical current is applied to a coil assembly to generate Lorentz forces to cause displacement of a mobile component magnet, a Hall sensor mounted proximate to the coil assembly and magnet can generate an output signal having voltage strength of 9 volts. However, as shown by curves 310 and 320, the 9-volt signal represents both a 7-volt contribution to the signal by the displacement of the magnetic field generated by the magnet and a 2-volt "corruption" of the signal by the coil assembly magnetic field.

As the displacement is the value which can be desired to be determined, an estimation of the relationship between applied electrical current and the portion of a given Hall sensor output signal which is caused by the coil assembly magnetic field can enable estimation of a hypothetical "correct" output signal voltage strength which removes the contribution of the coil assembly field from the output signal strength and enables accurate determination of the displacement of the mobile component, based at least in part upon a relationship between displacement and output signal. As shown in the illustrated embodiment, where an approximate estimation 322 of the relationship between applied electrical current and output signal contribution of the coil assembly field is determined, the contribution 322, at a given applied current, can be subtracted from the generated output signal 330 to arrive at a corrected output signal 312 which represents an approximation of a hypothetical "corrected" output signal caused by the mobile component displacement without corruption from the actuator coil field.

Coil Assembly Field Correction of Hall Sensor Output

Figure 4:
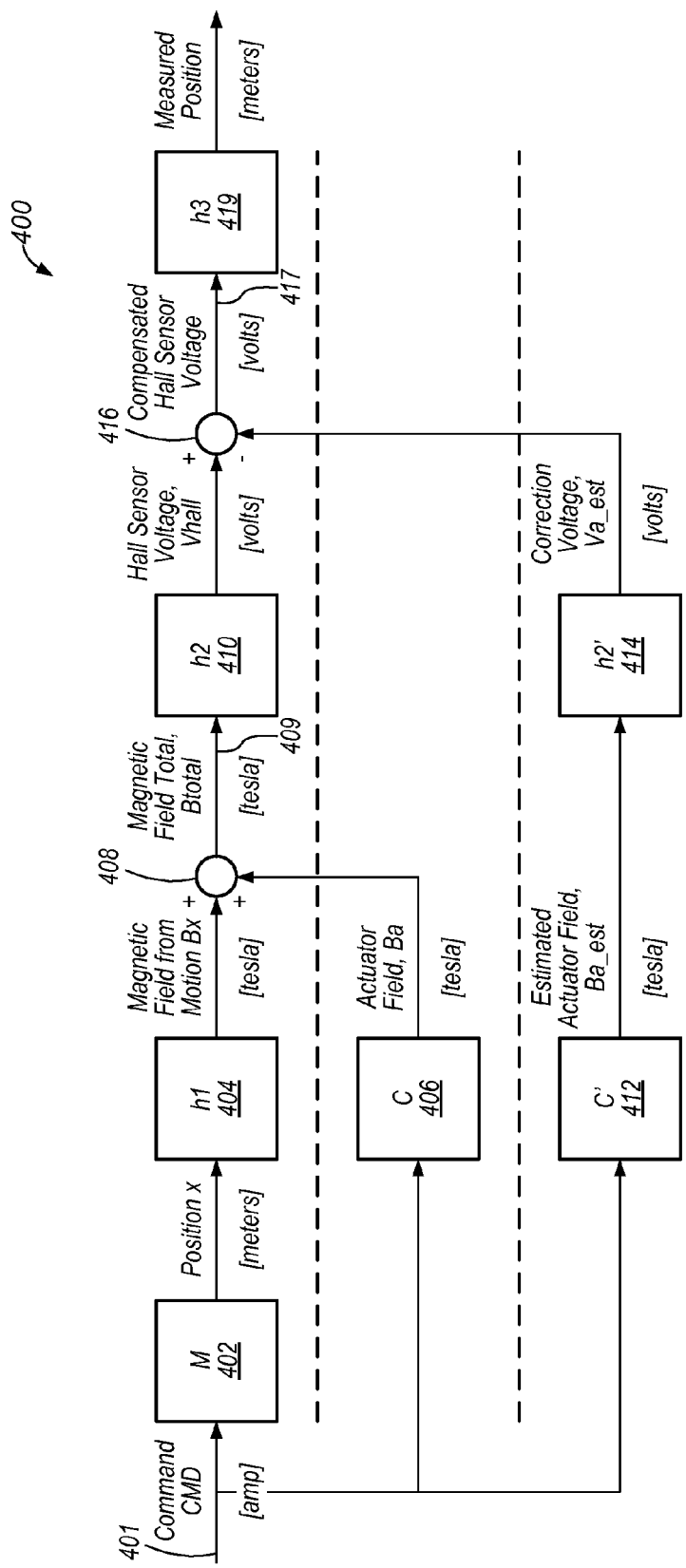
FIG. 4 illustrates a block diagram of a device for coil assembly field correction of a Hall sensor output signal, according to some embodiments.

FIG. 4 illustrates a block diagram of a device for coil assembly field correction of a Hall sensor output signal, according to some embodiments. In an embodiments, a device may measure displacement of a mobile component magnet and application of an offset signal to remove the corruption of the Hall sensor output signal, so that the corrected output indicates displacement of the mobile component magnet without corruption by the actuator coil field. The block diagram illustrated in FIG. 4 may illustrate output signal correction for any of the illustrated embodiments of Hall sensors, Lorentz actuator mechanisms, etc.

Representation 400 illustrates a command 401 which can be generated by a controller module in a control device, which results in application of a particular electrical current which has a particular current strength to a coil assembly of an actuator mechanism. As shown, the applied current results in a particular displacement 402 of a mobile component magnet, based at least in part upon Lorentz forces generated due to the applied current in the coil assembly. As shown, at 404, the displacement of the magnet in the mobile component results in a displacement of the magnetic field generated by the magnet, relative to a Hall sensor. The resulting displacement can result in the magnetic field sensed at the Hall sensor having a particular strength 404 in a particular direction.

As also shown at 406, the applied electrical current results in generation of a magnetic field 406 by the coil assembly. Strength of the field generated by the coil assembly in one or more directions can be sensed at the Hall sensor. As a result, the magnetic field strength, in one or more directions, sensed at the Hall sensor can be a result 408 of both the strength of the magnetic field 404 generated by the displaced magnet and the strength of the magnetic field 406 generated by the coil assembly. The resulting sensed magnetic field strength 409 results in the Hall sensor generating an output signal 410.

As further shown in the illustrated embodiment, where an estimation of the coil assembly-generated magnetic field 406 can be made, based at least in part upon the known applied electrical current and a determined relationship between same and the resulting coil assembly field, an estimated output signal 414 can be generated, where the estimated signal is an estimation of the portion of the generated signal 410 which is due exclusively to corruption of the magnetic field 409 that is a result of the magnetic field 406 generated by the coil assembly. Such a signal 414 is referred to herein interchangeably as a "correction" signal, "offset" signal, etc.

As shown at 416, the estimated offset signal 414 can be subtracted from the output signal 410 generated by the Hall sensor to arrive at a corrected output signal 417 which represents the voltage strength of a hypothetical output signal that the Hall sensor would have generated if the sensed magnetic field 404 resulting from the displaced magnet were not corrupted by the sensed magnetic field 406 generated by the coil assembly. The corrected output signal 418 can thus be used to calculate the displacement 419 of the mobile component which comprises the magnet.

Estimation of the correction signal 414 can involve determining a relationship between the applied current 401 and voltage strength of a correction signal 414, which can include estimating various coefficients associated with the relationship. Various processes to establish a relationship between a given applied voltage and the displacement of a mobile component, also referred to as a calibration process, can include one or more processes which include determining various coefficients to enable estimation of a correction signal. A discussion of some processes follows.

Figure 5:
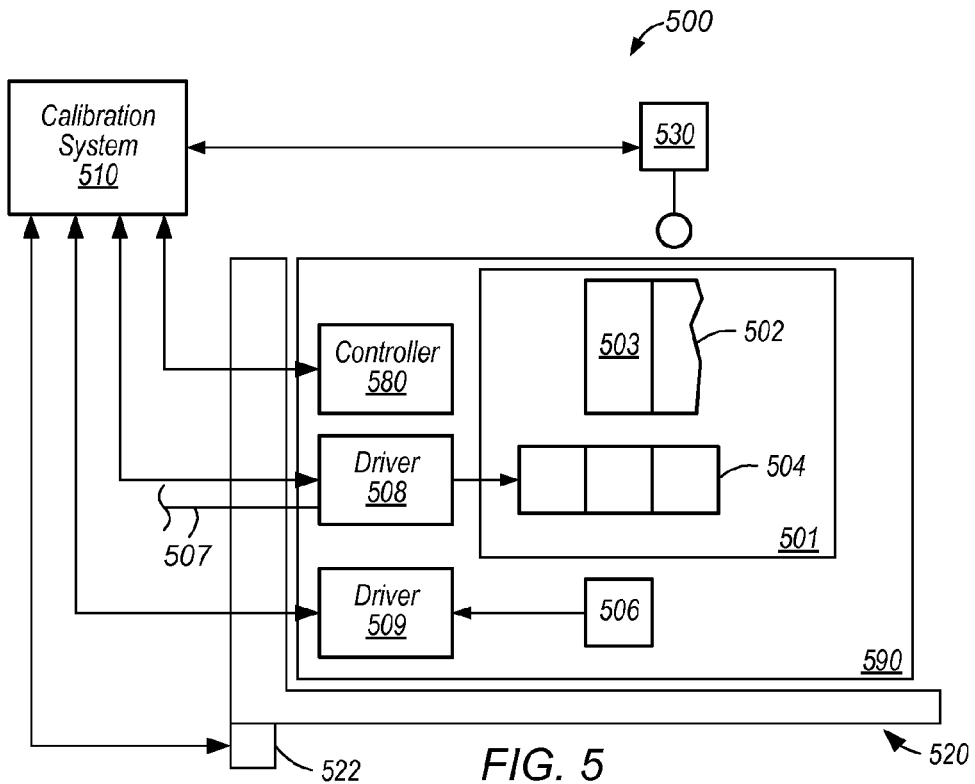
FIG. 5 is a block diagram illustrating a calibration system and an actuator module, which comprises a linear actuator mechanism and Hall sensor with drivers. The actuator module is coupled to a support structure, coupled to the calibration system, and coupled to a position sensor, according to some embodiments.

FIG. 5 is a block diagram illustrating a calibration system and an actuator module, which comprises a linear actuator mechanism and Hall sensor with drivers. The actuator module is coupled to a support structure, coupled to the calibration system, and coupled to a position sensor, according to some embodiments. The actuator module illustrated in FIG. 5 can include any actuator module illustrated in any other figures and can include any actuator mechanism illustrated in any other figures.

System 500 includes an actuator module 590 which includes a mobile component 502, actuator mechanism 501, Hall sensor 506, and drives 508, 509. Mobile component 502 can include a magnet 503 of the actuator mechanism 501 and can be configured to be displaced, based at least in part upon Lorentz forces generated in the actuator mechanism 501. Actuator mechanism 501 includes a coil assembly 504, which can be coupled to a static component of the actuator module (not shown) and is configured to generate Lorentz forces based at least in part upon application of an electrical current to the coil assembly 504 while the coil assembly is at least partially located in a magnetic field generated by magnet 503. Such application of electrical current can be controlled by driver 508, which can apply current from a power source 507. Actuator module 590 includes a Hall sensor 506 which is coupled to a static component of the actuator module (not shown) in proximity to the coil assembly and is communicatively coupled to a sensor driver 509, where the sensor 506 is configured to generate output signals for transmission to at least the driver 509 based at least in part upon a strength of a portion of a magnetic field at the sensor 506 which is in one or more particular directions. The drivers 508 and 508 can include the drivers 132, 134 illustrated above with reference to FIG. 1 and can be included in a controller device 130, as illustrated in FIG. 1. Actuator module 590 includes a controller module 580, which can be included in module 135 illustrated in FIG. 1 and can be included in a controller device 130, as illustrated in FIG. 1.

As shown, the actuator module 590 can be coupled to a calibration system 510 and various additional components, including the position sensor 530 and support structure 520, to enable the calibration system 510 to estimate a relationship between electrical current applied to the coil assembly 504, voltage strength of output signals generated by the Hall sensor 506, and a portion of the voltage strength of said generated signals caused by "coil assembly corruption" due to magnetic fields generated by the coil assembly 504 due to the applied electrical current, where the estimated relationship can be used by at least a portion of the actuator module, including controller module 580, driver 509, some combination thereof, etc. to "correct" output signals generated by the Hall sensor 506 to remove the contribution of the coil assembly 504 field to the generated signal, leaving a output signal that has a voltage strength associated with displacement of the mobile component 502 and not the coil assembly field.

As shown, calibration system 510 is coupled to the current driver 508, the Hall sensor driver 509, and the controller 580. Calibration system 510 can receive generated Hall sensor output signals from driver 509, receive indications of applied electrical current strength from driver 509, etc. Calibration system 510 can command application of a particular current to one or more of controller 580, driver 508, some combination thereof etc. In addition, calibration system 510 is coupled to position sensor 530. Position sensor 530 is configured to measure displacement of the mobile component 502 from an equilibrium position, and calibration system 510 is configured to receive data from sensor 530 which indicates the measured displacement. In some embodiments, position sensor 530 is physically coupled to support structure 520 and is not directly physically coupled to the actuator module 590. Support structure 520 is configured to adjustably position the actuator module 590 in one or more various orientations, positions, etc., and calibration system 510 is configured to receive data from one or more control elements (e.g., actuators, motors, etc.) 522 associated with the support structure 520 which indicate a present orientation, position, etc. of the actuator module 590 on the support structure 520. In some embodiments, calibration system 510 is configured to command one or more control elements 522 of the support structure 520 to adjust one or more of the position, orientation, etc. of the actuator module 590 via adjusting one or more of position, orientation, etc. of the support structure 520. Calibration system 510 can be implemented on one or more computer systems, as illustrated and discussed below.

Support structure 520 can comprise a fixture which is configured to stably hold the actuator module 590 and facilitate connections between the calibration system 510 and the drivers 580, 590 and controller 580. Support structure 520 can be isolated from environmental disturbances (e.g. vibration, thermal effects) that might move the mobile component 502 over the duration of a measurement, so that the sole source of motion is current commanded to the actuator. When the current is absent, the mobile component 502 rests stably at an equilibrium position The position sensor 530 can comprise a high fidelity position sensor, and the calibration system 510 can be implemented via high-speed (>2 kHz) interfaces to drivers 580, 590 controller 580, some combination thereof, etc.

Figure 6:
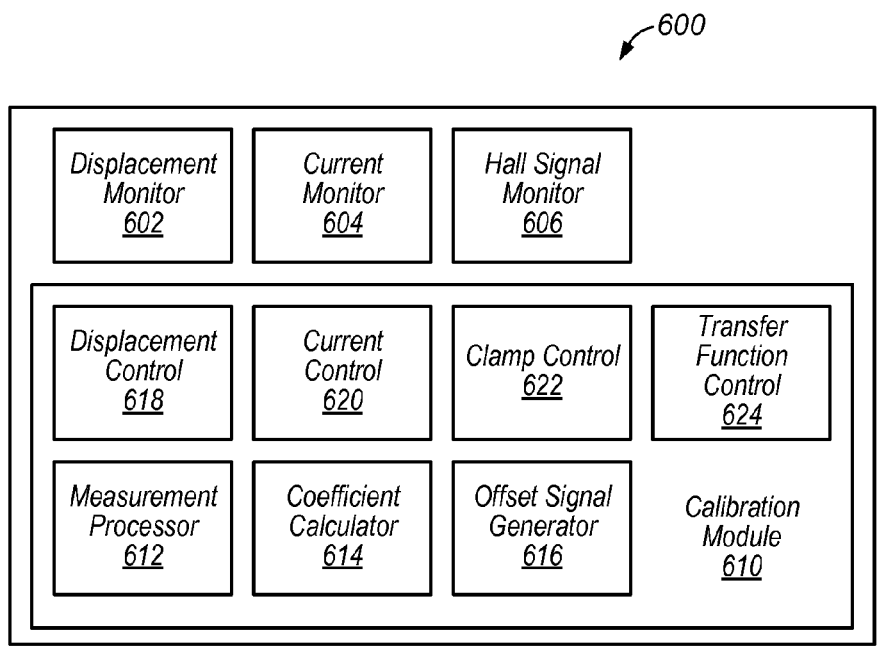
FIG. 6 illustrates a block diagram schematic of a calibration system which can be implemented in one or more computer systems to calibrate one or more portions of an actuator module to correct generated Hall sensor output signals to correct for coil assembly corruption, according to some embodiments.

FIG. 6 illustrates a block diagram schematic of a calibration system which can be implemented in one or more computer systems to calibrate one or more portions of an actuator module to correct generated Hall sensor output signals to correct for coil assembly corruption, according to some embodiments. The calibration system 600 can be implemented in one or more computer systems, including one or more computer systems internal to the actuator module, one or more computer systems external to the actuator module, some combination thereof, or the like. Calibration system 600 can be included in one or more calibration systems in any of the illustrated embodiments (e.g., system 510), one or more controller modules (e.g., module 135 of FIG. 1), controller devices (e.g., device 130 of FIG. 1), some combination thereof, etc.

Calibration system 600 includes a displacement monitor module 602 which receives displacement data from a position sensor which measures displacement (e.g., in micrometers) of the mobile component in an actuator module from an equilibrium position. Calibration system 600 includes a current monitor module 604 which receives current data from a current driver of an actuator module which indicates current strength (e.g., in milliamperes) of electrical current applied to a coil assembly in the actuator module. Calibration system 600 includes a Hall sensor monitor module 606 which receives output signal data from a Hall sensor driver of an actuator module which indicates a voltage strength (e.g., in volts) of output signals generated by a Hall sensor of the actuator module.

Calibration system 600 can include a calibration module 610 which includes one or more of the illustrated modules 612-624 and is configured to generate various coefficients and correction output signal relationships, also referred to herein as offset output signal relationships, between a given applied current strength and a given offset output signal voltage strength that, if subtracted from a voltage strength of a given output signal generated by the Hall sensor, results in a corrected output signal which represents displacement of the mobile component of the actuator module, independently of any magnetic field generated by the coil assembly in the actuator module.

Calibration module 610 includes a measurement processor module 612 which processes data received from one or more of various modules 602-604, 618-624. Such processing can include graphing various relationships between various measurements and various variables, including elapsed time. In some embodiments, module 612 includes a dynamic signal analyzer which is configured to capture transfer functions associated with one or more sets of measurements. Calibration module 610 includes a coefficient calculator module 614 which is configured to, based at least in part upon processing of various measurements at module 614, determine one or more various coefficients, offsets, etc. Such coefficients and offsets can include a "current coefficient", also referred to herein as "C2", which represents a relationship between a current strength of an electrical current applied to a coil assembly and a voltage strength of a Hall sensor output signal which is due exclusively to the magnetic field generated by the coil assembly as a result of the applied current. Such coefficients and offsets can include a "displacement coefficient", also referred to herein as "C1", which represents a relationship between a displacement of a mobile component which includes a magnet from an equilibrium position (e.g., in micrometers) and a voltage strength of a Hall sensor output signal which is due to the displacement. Various processes for determining the above coefficients C1 and C2 are illustrated and discussed below.

Calibration module 610 includes an offset signal generator module 616 which generates a relationship between an applied electrical current and a generated Hall sensor output signal, based at least in part upon processing of various measurements and various determined coefficients and offsets at module 614, which corrects for coil assembly corruption and results in an accurate determination of the displacement of the mobile component from an equilibrium position.

In some embodiments, calibration module 610 includes a displacement control module 618 which is configured to command various control elements of a support structure to which an actuator module is mounted to control the position, orientation, etc. of the support structure. Such control causes the mobile component of the actuator module to be displaced from an equilibrium position without applying current to a coil assembly of the actuator module. As a result, the effects of displacement alone upon output signals generated by the Hall sensor of the actuator module can be determined, based at least in part upon interaction between modules 618, 602, and 606.

In some embodiments, calibration module 610 includes a current control module 620 which is configured to control applied electrical current strength to the coil assembly of an actuator module and track variations in voltage strength of Hall sensor-generated output signals in response to abrupt changes in applied electrical current strength. As a result, because voltage and current variations can be tracked at faster rates than the response time of the displacement of the mobile component to changes in applied current strength, the "instantaneous" changes in Hall sensor output signal voltage strength due to changes in applied electrical current strength can be tracked, based at least in part upon interaction between modules 620, 604, and 606.

In some embodiments, calibration module 610 includes a clamped control module 622 which is configured to command various control elements of a clamp device to hold a mobile component of the actuator module in a particular position, including the equilibrium position, such that displacement of the mobile component in response to electrical current applied to the coil assembly of the actuator module is inhibited. As a result, the effects of applied electrical current alone upon output signals generated by the Hall sensor of the actuator module can be determined, based at least in part upon interaction between modules 622, 604, and 606.

In some embodiments, calibration module 610 includes a transfer function control module 624 which is configured to capture transfer functions with respect to applied current and Hall sensor output signals, applied current and displacement measurement, etc. Module 624 can comprise a dynamic signal analyzer. Module 624 can interact with modules 602, 604, 606 to verify accuracy of estimated coefficient values. In some embodiments, module 624 interacts with a dynamic signal analyzer which is external to system 600. In some embodiments, module 624 interacts with modules 602-606 in an iterative process which iteratively estimates and verifies one or more of current and displacement coefficients.

In some embodiments, one or more of the modules in system 600 is configured to operate synchronously. For example, modules 602-606 can be configured to synchronously record sets of data which include synchronously measured displacement, applied current strength, Hall sensor output signal voltage strength, etc. Such synchronous measurements can be included in data "sets" associated with a particular time period at which the measurements are synchronously recorded.

Figure 7:
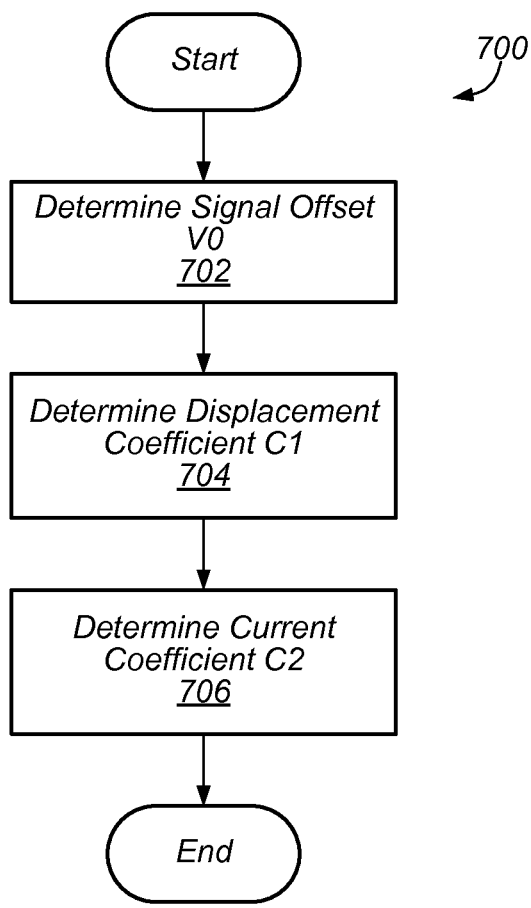
FIG. 7 illustrates a process for calibrating an actuator module to correct for coil assembly corruption of Hall sensor output signals, so that the corrected output signals can be used to accurately determine displacement of a mobile component in the actuator module, according to some embodiments.

FIG. 7 illustrates a process for calibrating an actuator module to correct for coil assembly corruption of Hall sensor output signals, so that the corrected output signals can be used to accurately determine displacement of a mobile component in the actuator module, according to some embodiments. The process illustrated in FIG. 7 can be implemented by one or more calibration systems illustrated herein, which can themselves be implemented by one or more computer systems.

In some embodiments, a relationship between a output signal generated by a Hall sensor, an electrical current applied to a coil assembly, and a displacement of a mobile component relative to the Hall sensor can be expressed as follows, where VHall is the voltage strength of the output signal generated by the Hall sensor, X is the displacement of the mobile component from the equilibrium position, U is the applied electrical current, V0 is an offset of the Hall sensor output signal voltage strength, also referred to as the "Hall offset", which represents the voltage strength of the output signal generated by the Hall sensor in the absence of applied electrical current or mobile component displacement, and C1 and C2 represent the above-discussed coefficients of the relationship between output signal strength and displacement and applied current strength, respectively:

$$VHall = C1*X + C2*U + V0 \quad (1)$$

In the above relationship, the illustrated contribution of the applied electrical current to the voltage strength of the generated output signal ("C2*U") represents the "corruption" of a given Hall sensor output signal voltage strength ("VHall") by a magnetic field generated by a coil assembly. As a result, calibrating an actuator module to correct for coil assembly corruption can include determining "C2". In addition, calibration can include determining "C1" and "V0", so that the displacement of the mobile component can be determined for a given applied current and output signal.

At 702, the Hall offset "V0" is determined to determine the voltage strength of the output signal generated by the Hall sensor in the absence of mobile component displacement or applied electrical current. As discussed below, V0 can be determined through one or more various processes, including measuring voltage strength of generated output signals while verifying absence of displacement and absence of applied electrical current.

At 704, the displacement coefficient "C1" is determine to determine the relationship between the voltage strength of the output signal generated by the Hall sensor and the displacement of the mobile component relative to the Hall sensor. As discussed below, C1 can be determined through one or more various processes.

At 706, the current coefficient "C2" is determined to determine the relationship between the voltage strength of the output signal generated by the Hall sensor and the strength of the electrical current applied to the coil assembly. As discussed below, C2 can be determined through one or more various processes. As shown above with regard to at least equation (1), an offset relationship between VHall, X, and U which enables accurate determination of mobile component displacement which corrects for coil assembly corruption of VHall can be established based at least in part upon determinations of C1, C2, and V0.

In some embodiments, the above determinations of coefficients C1, C2, and V0 can be referred to as "estimations" of same, respectively determining estimated coefficients C1', C2', V0'. As a determination of a voltage strength of a corrected output signal, referred to herein as VHall', can include subtracting an estimated offset signal voltage strength from the generated signal VHall, a relationship of the corrected signal to displacement X and applied current U can be represented as follows:

$$VHall' = (C1*X + C2*U + V0) - (C2'*U - V0') \sim = C1*X \quad (2)$$

As shown above, correcting for the coil assembly corruption results in a corrected output signal having a voltage strength VHall', which approximates a hypothetical voltage strength of a hypothetical output signal which would be generated by the Hall sensor due to the displacement of the mobile component if the Hall sensor were free from corruption by the coil assembly field. The corrected signal can be used to estimate the displacement of the mobile component as follows:

$$X = (1/C1')*VHall' \quad (3)$$

Such estimated coefficients may approximate the true coefficients within respective threshold margins. In some embodiments, coefficients C1, C2 are each constant values, thereby respectively representing separate linear relationships between VHall and U, VHall and X, etc.

Figure 8:
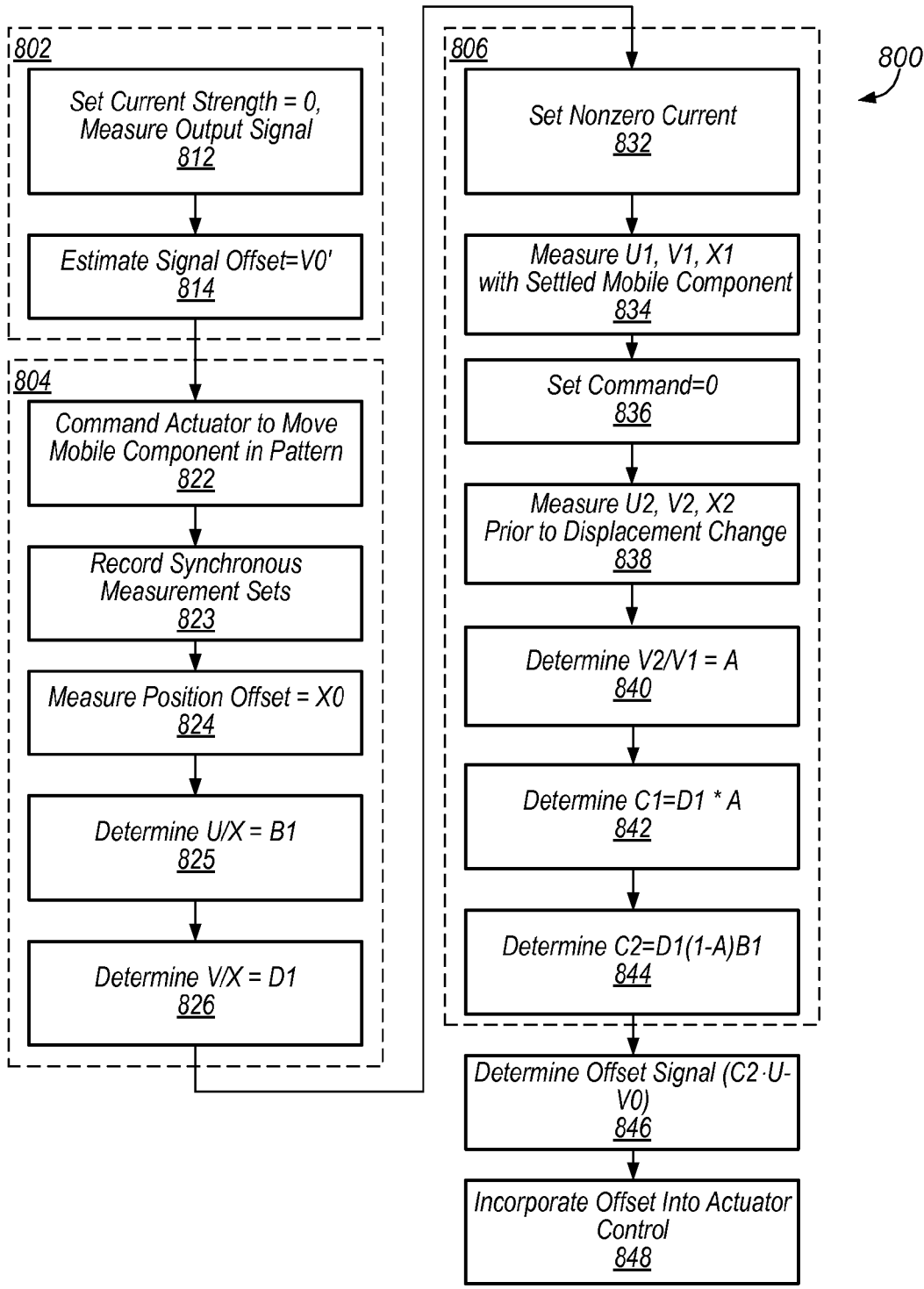
FIG. 8 illustrates utilizing multiple data sets to calibrate an actuator module to correct for coil assembly field corruption of Hall sensor output signals, so that the output signals can be used to accurately determine displacement of a mobile component in the actuator module, according to some embodiments.

FIG. 8 illustrates utilizing multiple data sets to calibrate an actuator module to correct for coil assembly field corruption of Hall sensor output signals, so that the output signals can be used to accurately determine displacement of a mobile component in the actuator module, according to some embodiments. The utilizing can be implemented by one or more various systems, devices, modules, etc., including one or more computer systems, one or more controller devices, one or more controller modules, one or more calibration systems, some combination thereof, etc.

In some embodiments, the processes illustrated herein can be implemented with regard to one or more of a set of actuator modules constructed at a manufacturing facility. The processes can be implemented at the manufacturing facility as part of construction of the actuator modules, subsequent to construction, etc. Where the actuator modules are configured to be included in another device, the processes illustrated herein can be implemented with regard to the actuator modules prior to the actuator modules being installed in the other devices. One or more of the processes can, in some embodiments, be implemented with regard to each actuator module constructed. In some embodiments, one or more of the processes are implemented with regard to a limited selection (e.g., a single actuator module or limited group of actuator modules) of a set, batch, lot, etc. of actuator modules constructed, and the outputs of the processes (e.g., a determined offset signal, a determined offset signal relationship between output signals and mobile component displacement and applied current strength, determined coefficient values, etc.) can be communicated to each of the actuators in the set, batch, lot, etc.

In some embodiments, one or more various calibration processes can be implemented with regard to one or more actuator modules, including actuator modules prior to installation of same in other devices, to calibrate the actuator modules to offset corruption of Hall sensor output signals due to one or more various corruption sources. For example, one or more various calibration processes can be implemented, by one or more calibration systems, one or more elements of the actuator modules themselves, etc. which configures the actuator modules to offset a portion of Hall sensor output signals which is associated with corruption of the output signals due to thermal effects in the actuator modules, including heat generation at one or more elements of the actuator module. For example, a calibration system can implement a calibration process which configures an actuator module to offset a corruption of output signals generated by Hall sensors of the actuator module, where the corruption is due to heat generated by a coil assembly of the actuator module. Such corruption can be referred to as "thermal corruption", and offsetting such corruption, and calibration to configure an actuator module to implement such offsetting, can be referred to as "thermal compensation".

In some embodiments, one or more of the processes illustrated and described herein can be implemented with regard to any of the actuator modules, calibration systems, etc. described herein.

In some embodiments, multiple separate sets of measurements (data sets) can be utilized to determine, also referred to herein interchangeably as "estimate", various coefficients which can be used to determine an offset signal, corrected output signal, estimate displacement using such corrected output signal, etc. Various data sets can be associated with particular commands to various drivers, various sets of sensor data from various data sources, etc. which are used to estimate particular coefficients. The actuator module, Hall sensor, sensors, drivers, modules, etc. described herein with reference to at least FIG. 8 can include any of the actuator module, Hall sensor, sensors, drivers, modules, etc. described with reference to any of the illustrated embodiments herein.

Calibration Data Set 1—Offset Measurements

At 802, a first data set is established and used to estimate offset coefficients which indicate one or more of output signal offset ("Hall offset") V0', displacement offset X0, etc. associated with the mobile component of an actuator module being located at an equilibrium position (e.g., no displacement from same), and an absence of electrical current application to a coil assembly of the actuator module.

At 812, a current driver configured to apply electrical current to a coil assembly of an actuator module is commanded to set the applied current strength to null, so that no electrical current is applied to the coil assembly by the current drive. Such a setting can include commanding the current driver to terminate current application.

At 814, the voltage strength "V" of the output signals generated by a Hall sensor are monitored concurrently with the absence of electrical current application to the coil assembly to determine an estimated Hall offset voltage strength (V0') which corresponds with an absence of both applied electrical current strength "U" and displacement "X" of the mobile component from the equilibrium position.

The estimated Hall offset V0' can be determined via tracking the generated output signal voltage strength V over a period of time at which the mobile component is "settled" such that the displacement of the mobile component does not vary from a particular offset value X0, which can represent a displacement of the mobile component from a reference value when the mobile component is positioned at the equilibrium position. In some embodiments, the estimated Hall offset V0' is determined based at least in part upon processing multiple measurements of offset signal voltage strength V over a period of time during which applied current is absent and mobile component displacement from the equilibrium position is absent, including one or more of an average value, medium value, etc.

As referred to herein, voltage strength of a signal can include an indication of whether the voltage is positive or negative (e.g., 9 volts, −9 volts, etc.). Similarly, current strength can include an indication of whether the current is positive or negative (e.g., 100 mA, −100 mA, etc.)

Calibration Data Set 2—Current Profile Measurements

At 804, a second data set is established and used to generate multiple sets of synchronously recorded measurements over a period of time during which a particular time-variation of applied current causes a corresponding time variation of mobile component displacement and voltage strength of Hall sensor-generated output signals.

At 822, one or more sets of command signals are generated to a current driver of the actuator module to apply electrical current to the coil assembly of the actuator mechanism according to a particular pattern of time-variation of applied electrical current strength. Such a pattern can include a sinusoidal variation of applied current strength over elapsed time.

Figure 9:
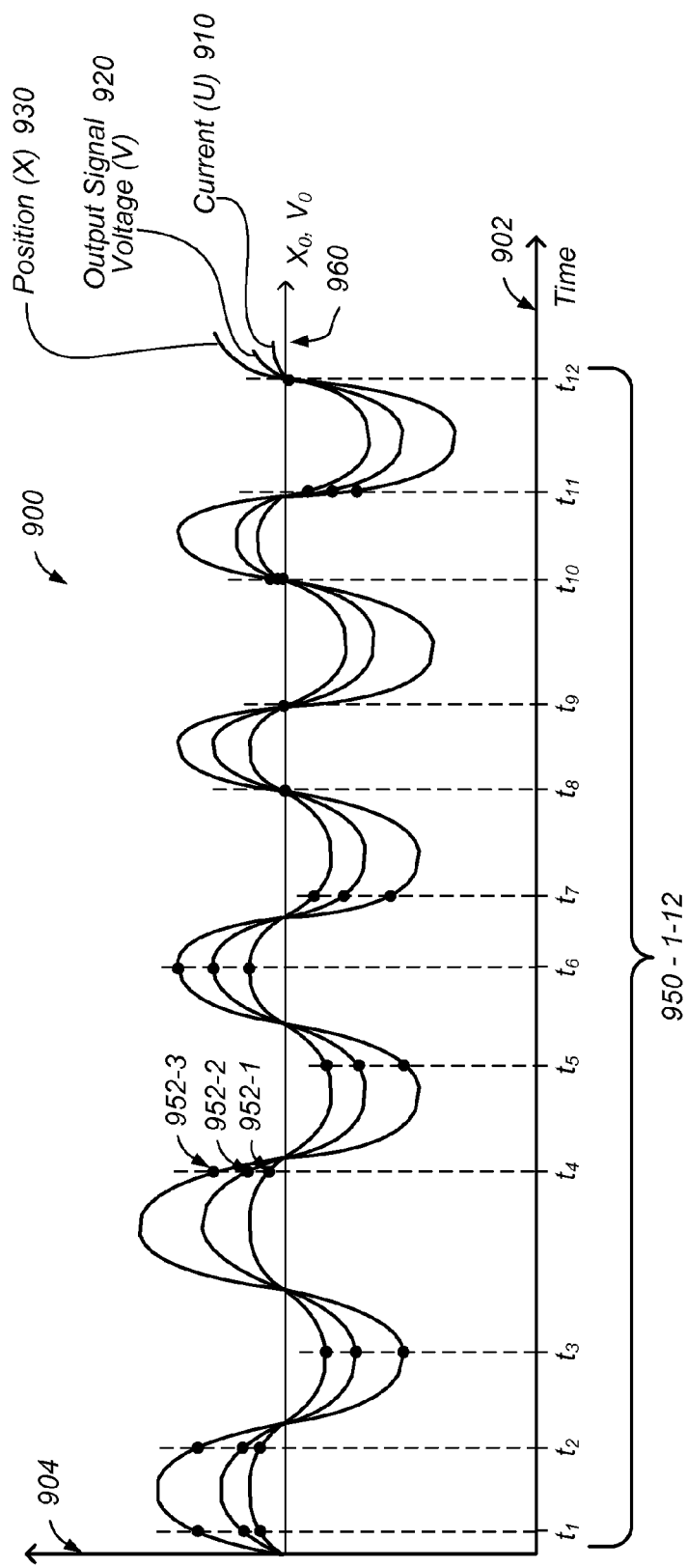
FIG. 9 illustrates a time-varying pattern of applied electrical current strength and corresponding time-varying Hall sensor generated output signal voltage strength and mobile component displacement over a period of elapsed time, according to some embodiments.

FIG. 9 illustrates a time-varying pattern 900 of applied electrical current strength 910 and corresponding time-varying Hall sensor generated output signal voltage strength 920 and mobile component displacement 930 over a period of elapsed time 902, according to some embodiments. In the illustrated embodiment, a sinusoidal time-varying pattern of electrical current strength 910 (e.g., ±2 Hz) is applied over a period of time, and the displacement and generated output signals 920, 930 similarly vary in sinusoidal patterns. In some embodiments, the pattern of electrical current strength includes a time-variation of current strength between the extremes of maximum current strength which can be applied to the coil assembly.

At 823, electrical current strength applied to the coil assembly of the actuator module ("U"), mobile component displacement ("X"), and output signal voltage strength ("V") are tracked during the time period at which the current pattern is applied. Applied current can be measured via data received from a current driver of the actuator module. Displacement can be measured via data received from a position sensor which directly measures displacement of the mobile component. Output signal voltage strength can be measured via data received from a Hall sensor driver of the actuator module which receives output signals generated by the Hall sensor.

In some embodiments, at least one set of displacement, current, and voltage measurements are recorded synchronously, such that the measurements represent a respective portion of the actuator module at a common period in time. Multiple sets of synchronous measurements can be recorded over a period of time. As shown in FIG. 9, multiple sets of measurements 950-1-12 can be recorded over time 902 during which the applied current 910 is varied according to a pattern. Each set 950 comprises synchronous measurements of applied current strength 952-1, output signal voltage strength 952-2, and displacement 952-3. As shown, the various sets 950 of measurements can be recorded at various time intervals, intermittently, and random intervals, some combination thereof, or the like.

At 824, a displacement offset (X0) which represents an equilibrium displacement of the mobile component is determined based at least in part upon the multiple sets 950 of synchronously-recorded measurements. At 825, a coefficient which represents a relationship between voltage strength of the output signals and the strength of the applied electrical current, also referred to herein as "B1", is determined based at least in part upon the multiple sets 950 of synchronously-recorded measurements. At 826, a coefficient which represents a relationship between voltage strength of the generated output signals and displacement of the mobile component, also referred to herein as "D1", are determined based at least in part upon the multiple sets 950 of synchronously-recorded measurements.

In some embodiments, determination of B1 and X0 includes determining a curve fit of multiple sets of synchronous measurements of applied current strength and displacement. In some embodiments, determining a curve fit comprises a least squares fit of a linear relationship between applied current strength and displacement.

Figure 10A:
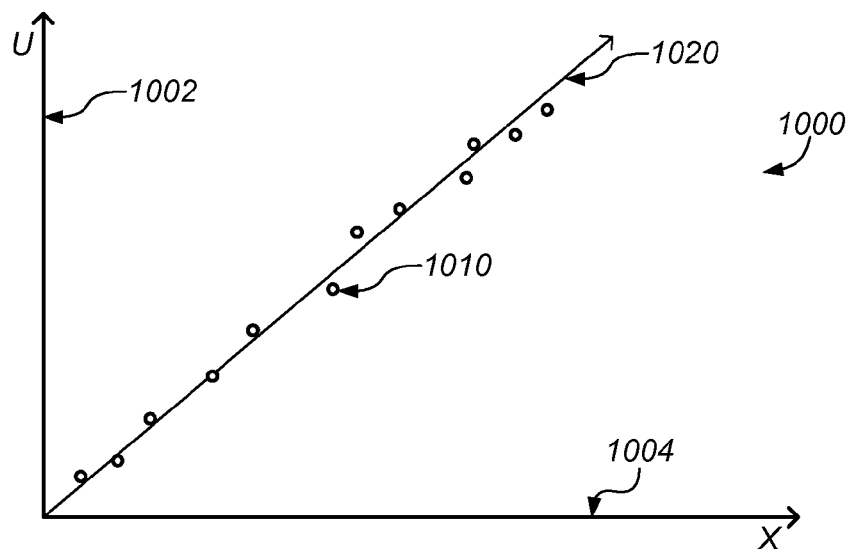
FIG. 10A illustrates a graphical representation of multiple synchronous measurements of applied current strength and mobile component displacement and a curve fit of a relationship between applied electrical current and displacement, according to some embodiments.

FIG. 10A illustrates a graphical representation 1000 of multiple synchronous measurements 1010 of applied current strength 1002 and mobile component displacement 1004 and a curve fit of a relationship 1020 between applied electrical current and displacement, according to some embodiments. In some embodiments, the curve fit is a least-squares fit of a linear relationship. The coefficient "B1" in the illustrated embodiment can be estimated as a constant value which is represented by the magnitude of the slope of the curve 1220, while the value of X0 is represented by the magnitude of the displacement where applied current strength 1004 equals zero on the linear curve 1220. In some embodiments, the curve 1220 can be expressed with the following equation:

$$X = B1 * U + X0 \qquad (4)$$

In some embodiments, determination of D1 includes determining a curve fit of multiple sets of synchronous measurements of generated output signals and mobile component displacement. In some embodiments, determining a curve fit comprises a least squares fit of a linear relationship between generated output signals and mobile component displacement.

Figure 10B:
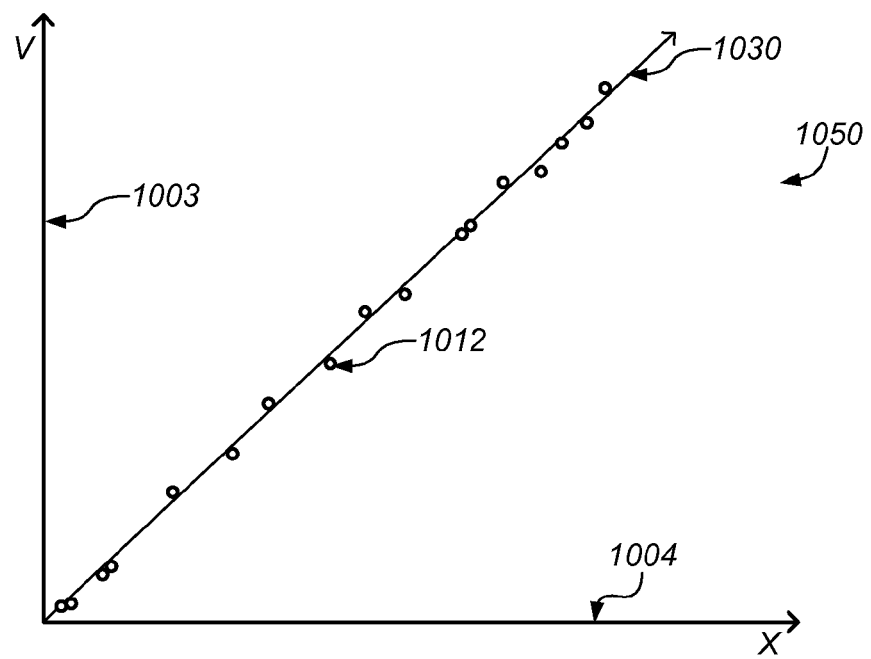
FIG. 10B illustrates a graphical representation of multiple synchronous measurements of generated output signal voltage strength against displacement and a curve fit of a relationship of the various synchronous measurements which represents that relationship between generated output signals and mobile component displacement, according to some embodiments.

FIG. 10B illustrates a graphical representation 1050 of multiple synchronous measurements 1012 of generated output signal voltage strength 1003 against displacement 1004 and a curve fit of a relationship 1030 of the various synchronous measurements 1012 which represents that relationship between generated output signals and mobile component displacement, according to some embodiments. In some embodiments, the curve fit is a least-squares fit of a linear relationship. The coefficient "D1" in the illustrated embodiment can be estimated as a constant value which is represented by the magnitude of the slope of the linear curve 1030.

Current Control Calibration

At 806, one or more of the displacement coefficient C1 and current coefficient C2 are estimated as C1' and C2', respectively. Such estimation of C1 and C2 can be implemented via various processes. At least one such process is illustrated in FIG. 8; it will be understood that the various other processes, illustrated further below, can be implemented at 806 in alternative to the process 806 illustrated in FIG. 8.

The process illustrated at 806 in FIG. 8 includes "Current Control" calibration, where coefficients C1 and C2 are estimated, as C1' and C2' respectively, based at least in part upon tracking of variations in Hall sensor-generated output signals based at least in part upon variations in applied electrical current which are sufficiently rapid to track variations in output signal which are approximately caused exclusively by applied current variation during a time period during which variation in mobile component displacement is negligible.

For example, in some embodiments, the computer systems implementing the process illustrated in FIG. 8 are configured to track variations in applied current strength and output signal voltage strength faster than the response time of mobile component displacement to variations in applied current strength. As a result, when current strength is abruptly changed, the Hall sensor can generate output signals which reflect the abrupt change in applied current strength, and such signals can be recorded, prior to measurable changes in mobile component displacement which subsequently occur as a result of changes in generated Lorentz forces at the coil assembly as a result of such changes in electrical current strength applied to the coil assembly. Such "instantaneous" changes in output signal voltage strength due to abrupt changes in applied current strength, and concurrent with negligible displacement change and prior to appreciable displacement change, can therefore be interpreted as changes solely in the coil assembly corruption of the generated output signal, thereby enabling an estimation of at least the current coefficient C2. The process illustrated at 806 in FIG. 8 can be implemented, at least in part, by a current control module of a calibration system, including module 620 illustrated in FIG. 6.

Figure 11:
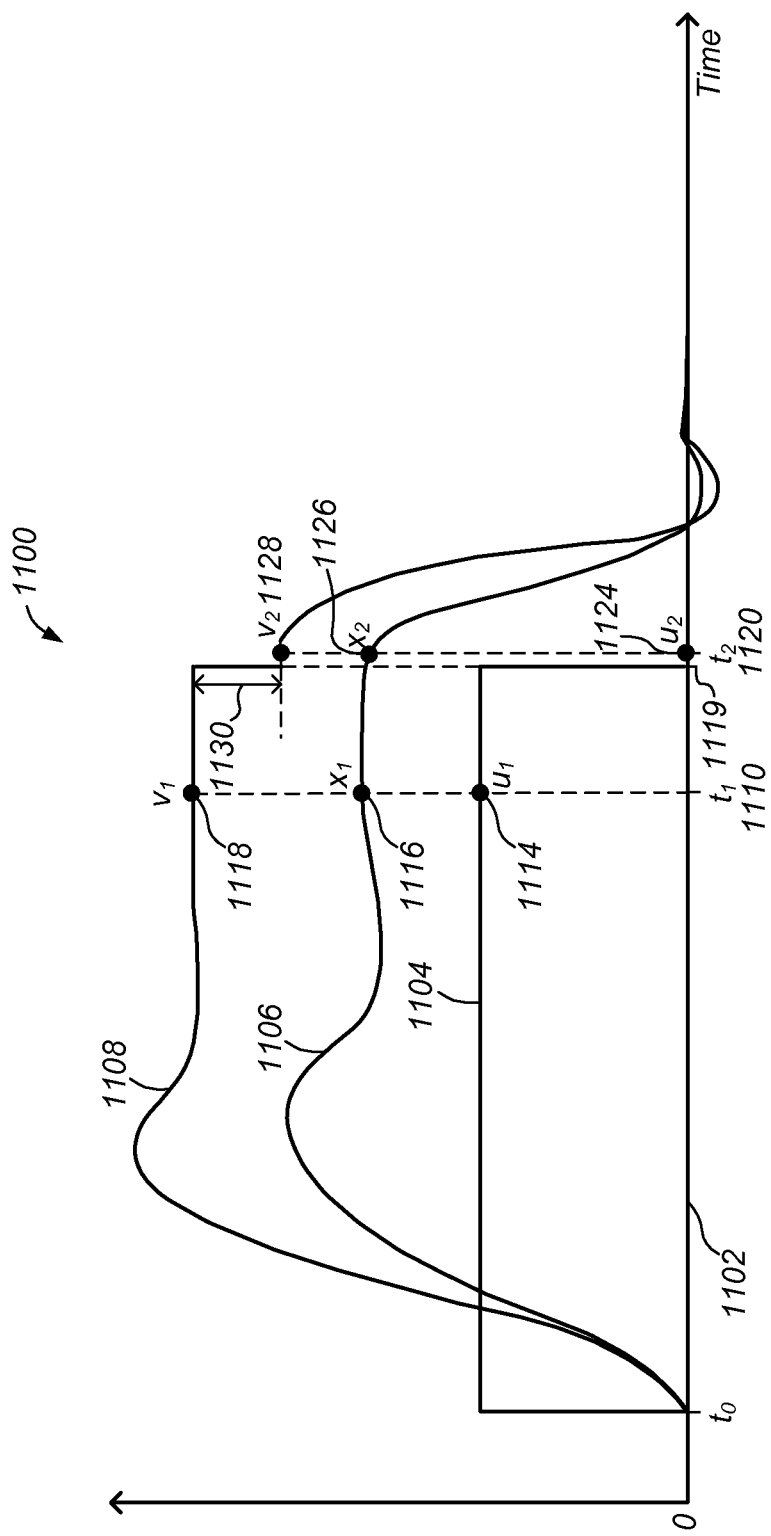
FIG. 11 illustrates a graphical representation of time variation of electrical current applied to an actuator coil assembly, Hall sensor-generated output signals, and mobile component displacement during current control calibration, according to some embodiments.

FIG. 11 illustrates a graphical representation of time variation of electrical current applied to an actuator coil assembly, Hall sensor-generated output signals, and mobile component displacement during current control calibration, according to some embodiments. As shown, a particular strength of electrical current 1104 is applied at a particular time "t0" and held constant over a period of time that is sufficient for the mobile component displacement 1106 which results from Lorentz forces generated based on the applied current 1104 stabilizes at a particular displacement value 1116. As a result of the stabilization of mobile component displacement 1106 under constant applied current 1104, the voltage strength 1108 of the output signals generated by the Hall sensor stabilize, within one or more margins of variation (e.g., 1% variation), at a value 1118. At 1034, one or more of applied current, displacement, and voltage can be synchronously recorded at one or more time periods "t1" 1110 which follow stabilization of displacement and signal voltage and preceding any change in applied current. In some embodiments, only voltage strength 1108 is tracked over time. In some embodiments, some combination of voltage strength 1108, applied current strength 1104, displacement 1106, etc. is tracked over time 1102.

At 836, following stabilization of applied current, displacement, and output signals, the applied current strength can be commanded to change, at a particular time 1119, to another value. In the illustrated embodiment, for example, applied current is terminated at point 1119, so that, at point 1119, the applied current strength abruptly changes from a first value 1114 to a null value 1124 associated with an absence of applied current. As shown in FIG. 11, a change in applied current results in an abrupt change 1130 in output signal voltage strength 1108, as the portion of the output signal voltage 1108 which is caused by coil assembly corruption due to applied current 1104 is abruptly changed with the abrupt change in applied current.

In addition, as shown, changes in applied current result in changes in mobile component displacement, which also result in changes to Hall sensor output signal, due to changes in generated Lorentz forces resulting from the change in applied current. However, as also shown in FIG. 11, such changes in displacement resulting from applied current changes can occur more slowly than changes in output signal voltage strength due to the same changes in applied current strength. As a result, an abrupt change in applied current strength can result in a change in output signal voltage strength 1108 which occurs after the change in applied current and during a time period in which any measureable change in mobile component displacement 1106 due to the change in applied current strength is negligible (e.g., <1% displacement change) (i.e., prior to a significant change in displacement 1106 resulting from the change in applied current 1104). At 838, where the abrupt change in applied current strength includes terminating applied current, the output signal voltage 1108, at a point in time "t2" 1120 which follows the termination of applied current and during which changes in mobile component displacement due to the termination of applied current is negligible, can be measured 1128 and interpreted as a output signal voltage strength which is caused by the synchronous mobile component displacement 1126 and is not caused by any coil corruption. In addition, the abrupt change in voltage 1130 can be interpreted as a portion of the output signal voltage strength 1118 which is caused exclusively by coil assembly corruption due to applied current strength 1114. In some embodiments, voltage strength 1128, displacement 1126, applied current strength 1124, some combination thereof, or the like are synchronously measured at time "t2" 1120. As referred to herein, the voltage strength of the output signal 1118 recorded following stabilization of the signal, at time "t1" 1110, is referred to as "V1" and the voltage of the voltage strength 1128 recorded at time "t2" 1120 following termination of the applied current and preceding non-negligible (e.g., >=1%) change in mobile component displacement 1106 resulting from said current termination is referred to as "V2". In some embodiments, the elapse of time between the abrupt change of applied current strength, at time point 1119, and time "t2" 1120 comprises a period of elapsed time which is less than a millisecond.

At 840, a coefficient representing the ratio of measured output signal voltage strengths prior to and immediately following the abrupt change in applied current strength is determined. Such a coefficient, referred to herein as "A", is a motion fraction which can represent a fraction of the output signal V1 which is due to applied current 1114 and the resulting coil assembly corruption of the output signal, where a linear relationship between a generated Hall sensor output signal voltage strength and a portion of the voltage strength which is exclusively caused by coil assembly corruption is assumed. The motion fraction "A" can be determined as a ratio of measured voltage strength "V2" over the measured voltage strength "V1".

In some embodiments, where the relationship between VHall and the portion of VHall which is exclusively caused by coil assembly corruption is linear, Equation (1) can be restated as follows:

$$V\text{Hall}=C1*X+C2*U+V0=A*V\text{Hall}+(1-A)*V\text{Hall} \quad (5)$$

As discussed above, coefficient "D1" can be calculated, based on a fit of voltage and displacement data, which indicates a linear relationship between a generated Hall sensor output signal voltage strength and the displacement of the mobile component. Such a relationship can be expressed as follows:

$$V\text{Hall}=D1*X+V0 \quad (6)$$

As noted above from a comparison of equations (6) and (5), the coefficient "D1" accounts for both the portion of VHall caused by mobile component displacement and coil assembly corruption. At 842 and 844, based at least in part upon equations (4), (5), and (6), and the calculated coefficients B1, D1, and A discussed above, the displacement coefficient ("C1") and current coefficient ("C2") can be estimated as follows:

$$C1'=D1*A \quad (7)$$

$$C2'=D1*(1-A)*B1 \quad (8)$$

At 846, based at least in part upon an estimation of the current coefficient ("C2"), an offset signal relationship can be established which indicates, for a given applied electrical current "U", a corresponding voltage strength "VCorr" of an offset signal which represents a portion of the voltage strength of the output signal generated by the Hall sensor ("VHall") which is exclusively caused by coil assembly corruption. As noted above with respect to equation (2), such an offset voltage strength can be calculated according to the following relationship:

$$V\text{Corr}=C2'*U-V0' \quad (9)$$

At 848, the calculated offset relationship between applied electrical current and offset signal can be incorporated into a portion of the actuator module which is configured to determine mobile component displacement based at least in part upon output signals ("VHall") generated by the Hall sensor of the actuator module. Such a portion into which the calculated relationship is incorporated can include a controller module 135, controller device 130, etc. and the incorporation can include communicating some or all of the above-determined, calculated, estimated, etc. coefficients. In some embodiments, particular equations are communicated with the communicated coefficients, and the controller device 130 is configured to implement said communicated equations and coefficients to determine, for a given applied electrical current ("U") and generated output signal ("VHall"), one or more of an estimated corrected output signal (VHall'), estimated mobile component displacement (X'), etc. For example, the incorporation can include communicating, to some portion of module 130 of an actuator module, via one or more communicative couplings between the computer system implementing the process illustrated in FIG. 8 and device 130, one or more of estimated coefficients C1', C2', V0', X0, B1, D1, A, etc. In addition, the incorporation can include communicating, to device 130, one or more of equations (1)-(9), in addition to the above estimated coefficients.

Figure 12:
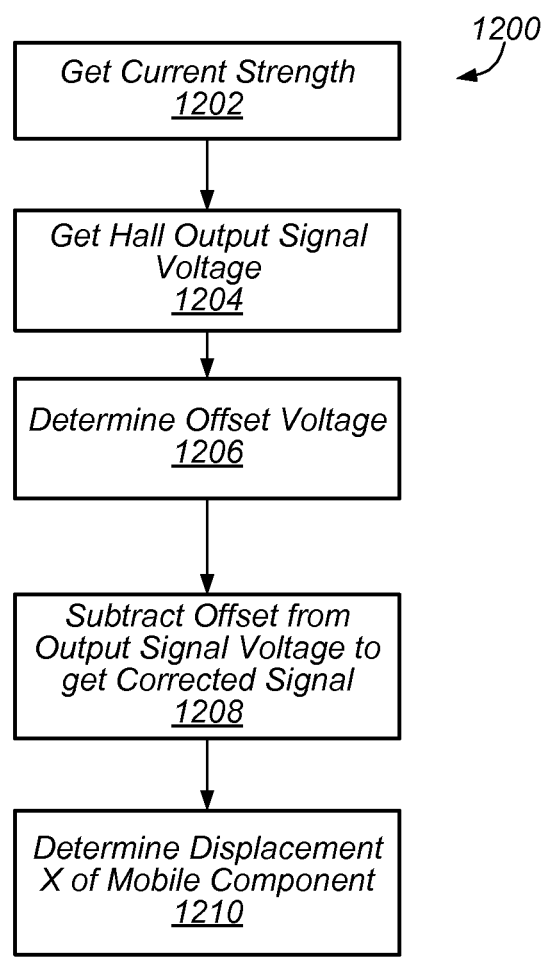
FIG. 12 illustrates implementing a calibration of an actuator module to determine a displacement of a mobile component of the actuator module, based at least in part upon Hall sensor output signals and applied electrical current, while correcting for coil assembly field corruption of Hall sensor output signals, according to some embodiments.

FIG. 12 illustrates implementing a calibration of an actuator module to determine a displacement of a mobile component of the actuator module, based at least in part upon Hall sensor output signals and applied electrical current, while correcting for coil assembly field corruption of Hall sensor output signals, according to some embodiments. The implementing can be implemented by one or more controller modules, controller devices, etc. in an actuator module illustrated in any of the embodiments herein, including one or more control modules implemented by one or more computer systems as described herein. For example, the implementing 1200 illustrated in FIG. 12 can be implemented by control module 135 illustrated in FIG. 1.

At 1202, a current strength value ("U") of an electrical current applied to a coil assembly of the actuator module is determined. Such a current strength value can indicate a magnitude and direction of the applied current (e.g., 10 mA). At 1204, a voltage strength value ("VHall") of an output signal generated by a Hall sensor in the actuator module is determined. Such a voltage strength value, also referred to herein as "voltage", can indicate a magnitude and direction of a voltage of the generated output signal (e.g., 9 volts).

At 1206, a voltage strength value of an offset signal ("VCorr") which represents a portion of the generated output signal which is caused by coil assembly corruption due to the applied electrical current, is determined. As noted above with reference to equation (9), the offset output signal can be determined based at least in part upon the value of the applied electrical current strength, determined at 1402, and values of coefficients C2' and V0, determined above with reference to the process illustrated in FIG. 10. The values of coefficients C2' and V0 can be received from a source external to the computer system implementing the process illustrated in FIG. 12, prior to implementation of the process. At 1208, the value of the offset output signal determined at 1206 is subtracted from the determined value of the output signal generated by the Hall sensor. As noted above with respect to equations (1) and (2), such a subtraction can result in a voltage strength value of a corrected output signal ("VHall'") which represents the effect of mobile component displacement without corruption by a coil assembly field at the Hall sensor. At 1210, the corrected output signal voltage is used to determine a displacement of the mobile component from the equilibrium position. Such a determination can include calculating, via the above-noted equation (3), the value of VHall' determined at 1408, and the value of coefficient C1' determined above with reference to the process illustrated in FIG. 8.

Clamped Control Calibration

In some embodiments, one or more of the displacement coefficient C1 and current coefficient C2 are estimated as C1' and C2', respectively, via a clamped control process where Hall output signals and applied electrical current are measured where a clamp device is coupled to the mobile component of the actuator module to inhibit displacement of the mobile component in response to Lorentz forces generated at the coil assembly of the actuator module. As a result, the effects of coil assembly corruption alone upon the output signal generated by the Hall sensor can be determined and used to determine C1' and C2'. Such a clamped control process can be implemented in alternative to the process illustrated at 806 in FIG. 8.

Figure 13:
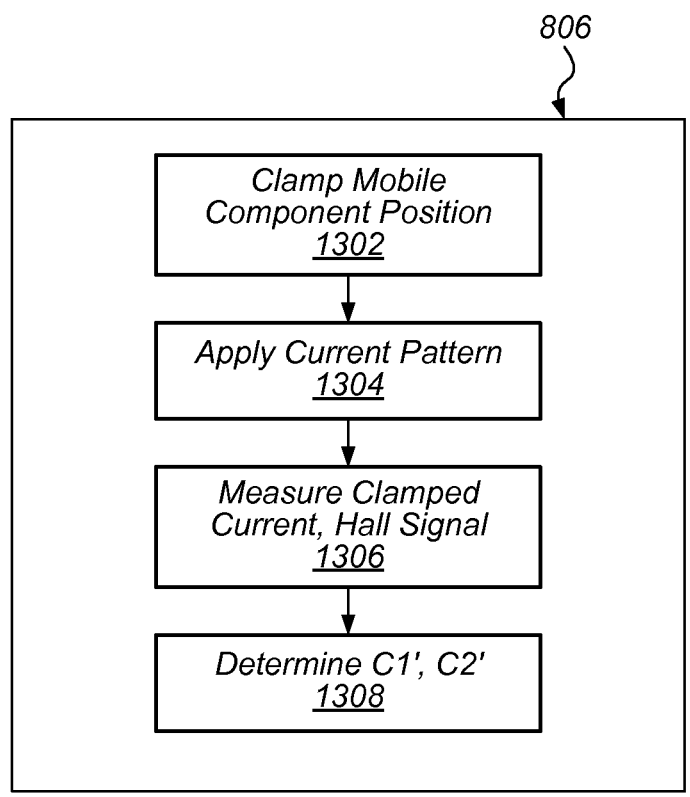
FIG. 13 illustrates utilizing clamped control of a mobile component of the actuator module to calibrate an actuator module to correct for coil assembly field corruption of Hall sensor output signals, so that the output signals can be used to accurately determine displacement of a mobile component in the actuator module, according to some embodiments.

FIG. 13 illustrates utilizing clamped control of a mobile component of the actuator module to calibrate an actuator module to correct for coil assembly field corruption of Hall sensor output signals, so that the output signals can be used to accurately determine displacement of a mobile component in the actuator module, according to some embodiments. The illustrated utilization, as shown in FIG. 13, is a process 806 which can be implemented as process 806 in FIG. 8, in alternative to the process 806 illustrated in FIG. 8.

At 1302, a clamp device is controlled to couple with a mobile component of the actuator module being calibrated to hold the mobile component in a particular position in the actuator module and to inhibit displacement of the mobile component in response to Lorentz forces generated in the coil assembly of the actuator module.

Figure 14:
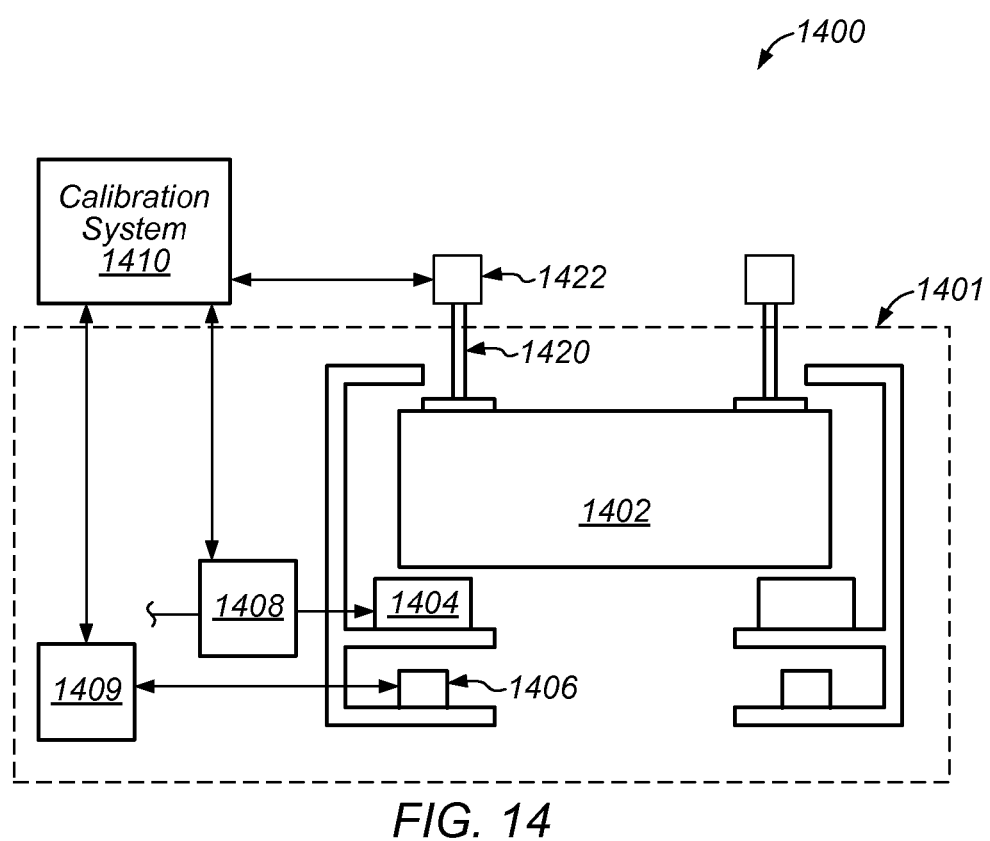
FIG. 14 is a block diagram illustrating a calibration system which is configured to control a clamp device to inhibit displacement of a mobile component in an actuator module, according to some embodiments.

FIG. 14 is a block diagram illustrating a calibration system which is configured to control a clamp device to inhibit displacement of a mobile component in an actuator module, according to some embodiments. The actuator module illustrated in FIG. 14 can include an actuator module illustrated in any other figures and can include any actuator mechanism illustrated in any other figures. The calibration system illustrated in FIG. 14 can include a calibration system illustrated in any other figures.

As shown in FIG. 14, a system 1400 which includes a calibration system 1410 which is communicatively coupled to various drivers 1408, 1409 of an actuator module 1401 is communicatively coupled to one or more control elements 1422 of a clamp device 1420. The calibration system 1410 can generate command signals to the control elements 1422, which can include actuators, motors, etc. to couple with the mobile component 1402 of the actuator module 1401 to inhibit displacement of the mobile component 1402, relative to the Hall sensor 1406 of the actuator module, in response to Lorentz forces generated at coil assembly 1404. In the illustrated embodiment, Hall sensor 1406 and coil assembly 1404 are coupled to a static component 1403 of the actuator module; it will be understood that other configurations of the Hall sensor 1406 and coil assembly 1404, relative to the mobile component 1402, are encompassed herein. In some embodiments, the controlling of the clamp device includes commanding the clamp device to hold the mobile component in a position which corresponds to the equilibrium position.

At 1304, application of electrical current to the coil assembly of the actuator module is commanded, concurrently with maintaining the inhibiting of mobile component displacement via the clamp device. Commanding application of electrical current can include generating one or more sets of command signals to a current driver of the actuator module to apply electrical current to the coil assembly of the actuator mechanism according to a particular pattern of time-variation of applied electrical current strength. Such a pattern can include a sinusoidal variation of applied current strength over elapsed time.

Figure 15:
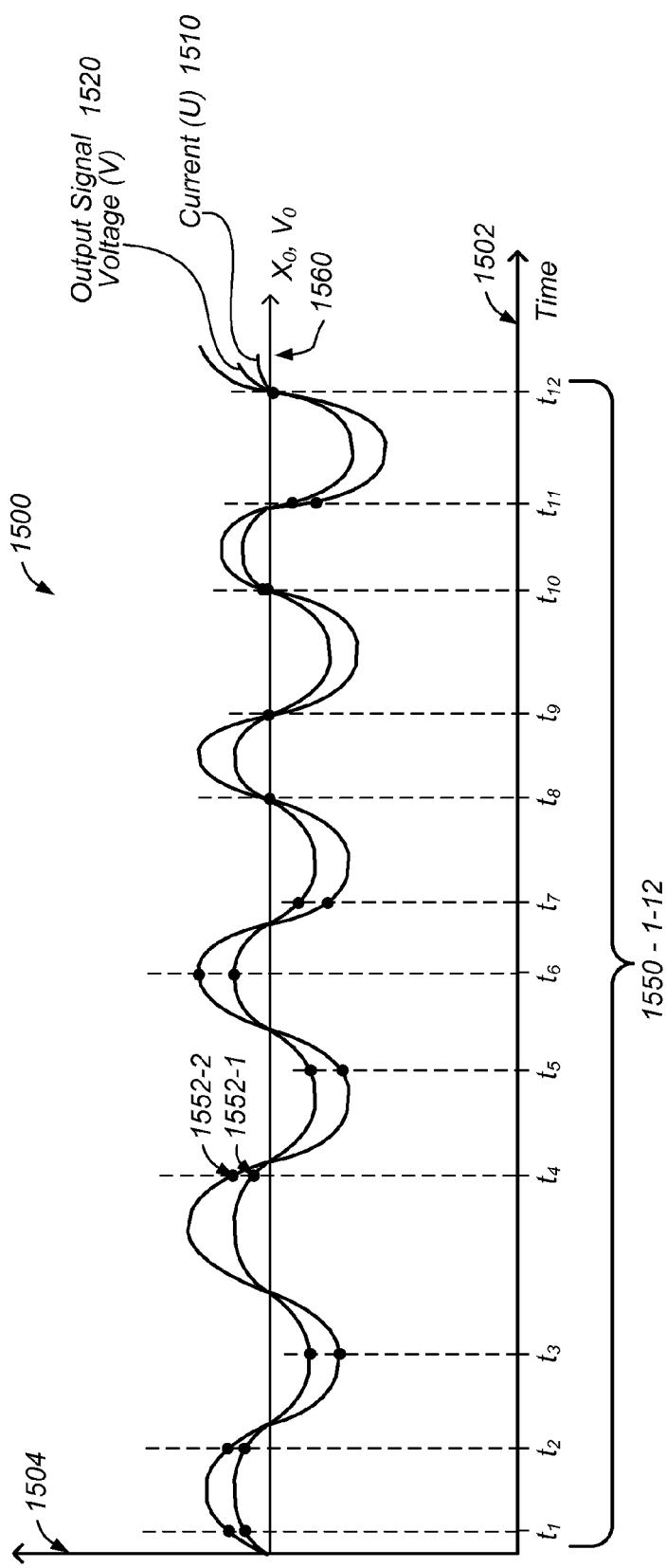
FIG. 15 illustrates a time-varying pattern of applied electrical current strength and corresponding time-varying Hall sensor generated output signal voltage strength over a period of elapsed time, according to some embodiments.

FIG. 15 illustrates a time-varying pattern 1500 of applied electrical current strength 1510 and corresponding time-varying Hall sensor generated output signal voltage strength

1520 over a period of elapsed time 1502, according to some embodiments. In the illustrated embodiment, a sinusoidal time-varying pattern of electrical current strength 1510 (e.g., ±2 Hz) is applied over a period of time, and the current strength and generated output signals 1510, 1520 similarly vary in sinusoidal patterns.

At 1306, electrical current strength applied to the coil assembly of the actuator module ("U") and output signal voltage strength ("V") are tracked during the time period at which the current pattern is applied. Applied current can be measured via data received from a current driver of the actuator module. Output signal voltage strength can be measured via data received from a Hall sensor driver of the actuator module which receives output signals generated by the Hall sensor.

In some embodiments, at least one set of current and voltage measurements are recorded synchronously, such that the measurements represent a respective portion of the actuator module at a common period in time. Multiple sets of synchronous measurements can be recorded over a period of time. As shown in FIG. 15, multiple sets of measurements 1550-1-12 can be recorded over time 1502 during which the applied current 1510 is varied according to a pattern. Each set 1550 comprises synchronous measurements of applied current strength 1552-1 and output signal voltage strength 1552-2. As shown, the various sets 1550 of measurements can be recorded at various time intervals, intermittently, and random intervals, some combination thereof, or the like.

At 1308, the displacement coefficient ("C1") and current coefficient ("C2") can be estimated based at least in part upon the sets of synchronous current and voltage measurements. In some embodiments, determination of C1' and C2' includes determining a curve fit of multiple sets of synchronous measurements of applied current strength and Hall sensor output signal voltage. In some embodiments, determining a curve fit comprises a least squares fit of a linear relationship between applied current strength and voltage strength.

Figure 16:
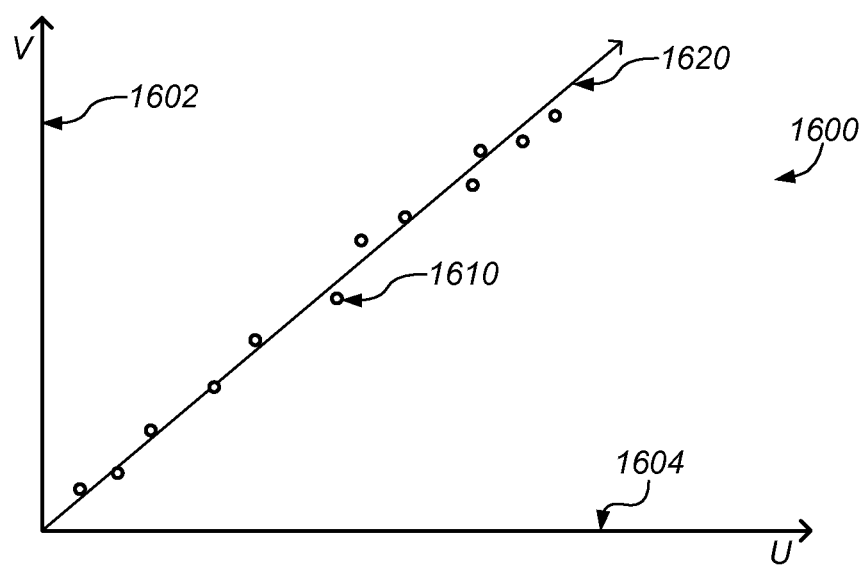
FIG. 16 illustrates a graphical representation of multiple synchronous measurements of applied current strength against generated Hall sensor output signal voltage strength, where displacement of the mobile component is inhibited, and a linear curve fit of the various synchronous measurements which represents a linear relationship between applied electrical current and output signal in the absence of mobile component displacement, according to some embodiments.

FIG. 16 illustrates a graphical representation of multiple synchronous measurements 1610 of applied current strength against generated Hall sensor output signal voltage strength, where displacement of the mobile component is inhibited, and a linear curve fit 1620 of the various synchronous measurements which represents a linear relationship between applied electrical current and output signal in the absence of mobile component displacement, according to some embodiments. In some embodiments, the curve fit is a least-squares fit of a linear relationship.

The coefficient "C2" in the illustrated embodiment can be estimated as a constant value which is represented by the magnitude of the slope of the curve 1620, while the value of V1 is represented as the voltage strength of the output signal where applied current strength 1604 equals zero on the linear curve 1620. In some embodiments, the curve 1620 can be expressed with the following equation:

$$V\text{Hall} = C2*U + V1 \quad (10)$$

In addition, because the mobile component displacement (value X in equation (1)) is constant in the relationship 1620 shown in FIG. 16, due to the inhibition of such displacement by the clamp device, measurement V1 can be expressed as follows, based at least in part upon equations (1) and (10):

$$V1 = C1X + V0 \quad (11)$$

Based at least in part upon equation (10) and the second set of measurements of current and voltage (U2, V2), a value of C2 can be estimated as C2'. In addition, based at least in part upon equations (4) and (11), along with one or more of the first and second sets of measurements, a value of C1 can be estimated as C1'. In some embodiments, based at least in part upon equations (7) and (8), C1 can be estimated based on the following relationship:

$$C1' = D1*\{1 - [C2'/(D1*B1)]\} \quad (12)$$

Based at least in part upon the estimated coefficient values (C1', C2'), an offset signal can be determined as illustrated in 846 of FIG. 8.

Displacement Control Calibration

In some embodiments, one or more of the displacement coefficient C1 and current coefficient C2 are estimated as C1' and C2', respectively, via a displacement control process where the mobile component of the actuator module is caused to be displaced from the equilibrium position, without commanding application of electrical current, and C1' and C2' are determined based at least in part upon determining a relationship between measured mobile component displacement ("X") and Hall sensor generated output signal voltage strength ("V") in the absence of applied electrical current. As a result, the effects of mobile component displacement alone upon the output signal generated by the Hall sensor can be determined and used to determine C1' and C2'. Such a displacement control process can be implemented in alternative to the process illustrated at 806 in FIG. 8.

Figure 17:
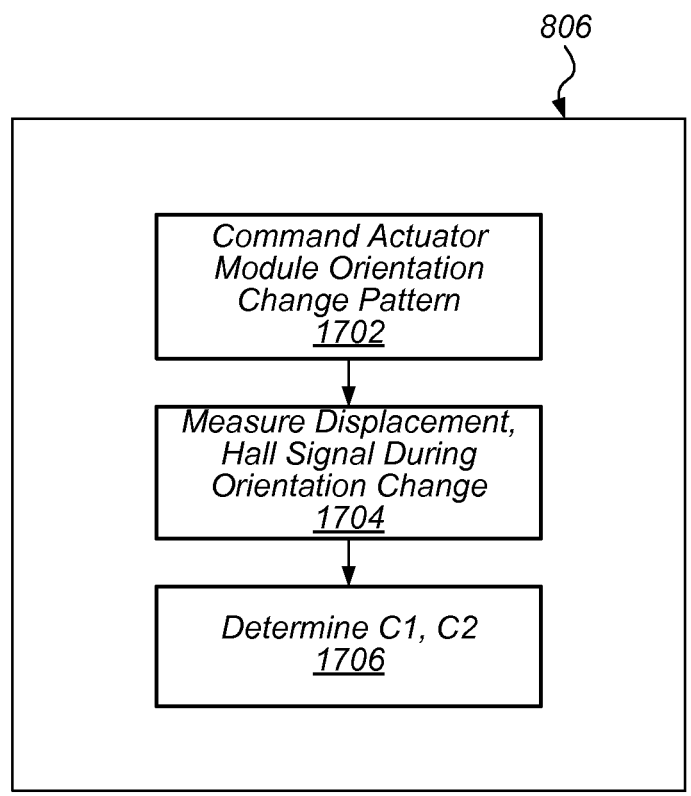
FIG. 17 illustrates utilizing displacement control of a mobile component of the actuator module to calibrate an actuator module to correct for coil assembly field corruption of Hall sensor output signals, so that the output signals can be used to accurately determine displacement of a mobile component in the actuator module, according to some embodiments.

FIG. 17 illustrates utilizing displacement control of a mobile component of the actuator module to calibrate an actuator module to correct for coil assembly field corruption of Hall sensor output signals, so that the output signals can be used to accurately determine displacement of a mobile component in the actuator module, according to some embodiments. The illustrated utilization, as shown in FIG. 17, is a process 806 which can be implemented as process 806 in FIG. 8, in alternative to the process 806 illustrated in FIG. 8.

At 1702, one or more sets of command signals are generated to a control element of the support structure, to which the actuator module is coupled, to change one or more of orientation and position of one or more portions of the support structure according to a particular time-varying pattern, concurrently with an absence of electrical current being applied to the coil assembly of the actuator module. Such time-varying changing of one or more of orientation, position, etc. of one or more portions of the support structure results in time-varying changing of one or more of orientation, position, etc. of the actuator module, which results in changing of the mobile component displacement, according to the time-varying pattern.

A time varying pattern of one or more of orientation, position, etc. can include a time varying pattern of motion of one or more portions of the support structure, including a sinusoidal pattern of translation of one or more portions of the support structure in one or more directional axes over time. Another time varying pattern of one or more of orientation, position, etc. can include rotation of at least a portion of the support structure over time, including full, 360-degree rotation, oscillating rotation, etc. which results in the actuator module being rotated in orientation over time. Such changes result in the mobile component in the actuator module being displaced from equilibrium in a pattern of displacement which tracks the pattern through which the one or more portions of support structure changes one or more of orientation, position, etc.

Figure 18:
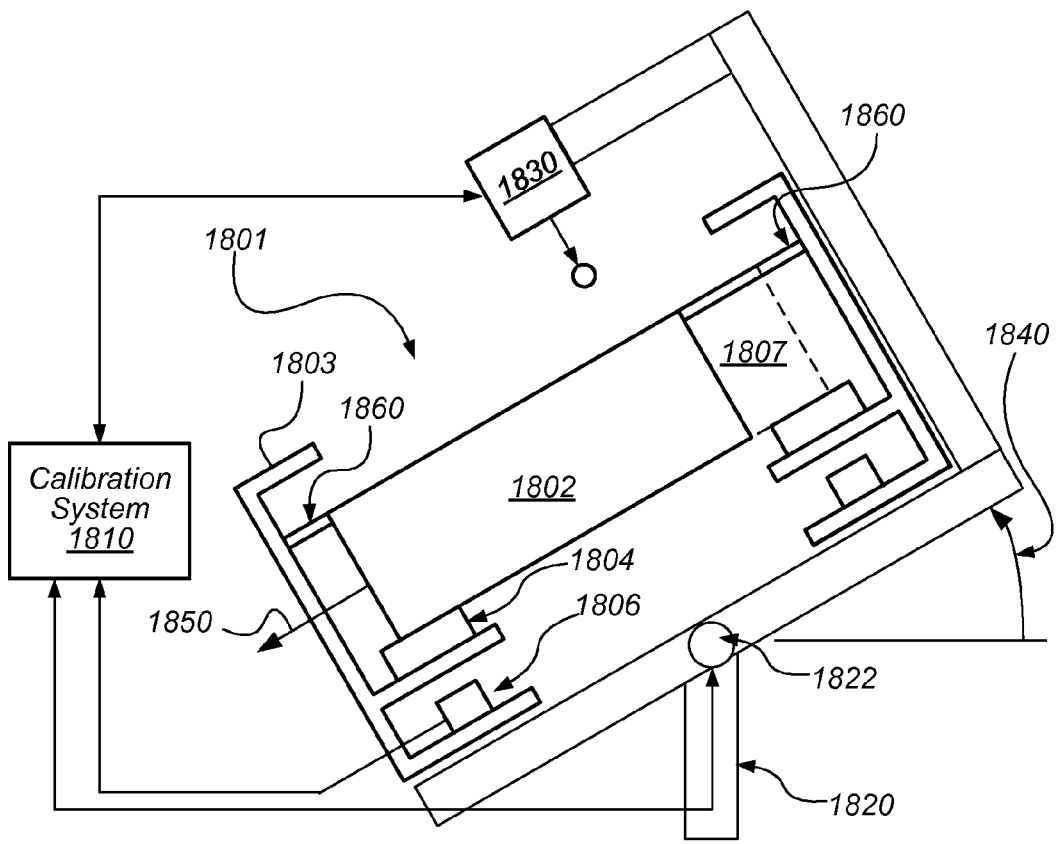
FIG. 18 is a block diagram illustrating a calibration system which is communicatively coupled to an actuator module, a support structure to which the actuator module is coupled, and a position sensor coupled to the support structure, according to some embodiments.

FIG. 18 is a block diagram illustrating a calibration system which is communicatively coupled to an actuator module, a support structure to which the actuator module is coupled, and a position sensor coupled to the support structure, according to some embodiments. The actuator module illustrated in FIG. 18 can include an actuator module illustrated in any other figures and can include any actuator mechanism illustrated in any other figures. The calibration system illustrated in FIG. 18 can include a calibration system illustrated in any other figures.

Command signals can be generated to a current drive of the actuator module to terminate current application, concurrently with commanding the support structure control elements. Such a pattern can include a sinusoidal variation of orientation, position, etc. of the support structure which causes a corresponding sinusoidal variation of orientation of the actuator module in the support structure over time. As shown in FIG. 18, a calibration system 1810 is coupled to a control element 1822 of a support structure 1820 to which an actuator module 1801 is coupled. A position sensor 1830, which can include the position sensor illustrated in FIG. 5, is coupled to the support structure 1820, and the calibration system 1810 is coupled to the position sensor, so that displacement measurements generated by the position sensor are received at the calibration sensor. In addition, the calibration system is communicatively coupled to at least a Hall sensor 1806 of the actuator module 1801 and can be communicatively coupled to a current driver 1808 of the actuator module 1801. In some illustrated embodiment, calibration system 1810 generates command signals to the control element 1822 which command the control element to execute a sinusoidal time-varying pattern of orientation of the actuator module 1810.

Such time-varying orientation can include commanding the control element 1822 to rotate 1840 a portion of the support structure 1820 at a particular rate, such that orientation of the actuator module changes 1840 at a constant rate. As a result, as shown in FIG. 18, as the portion of the support structure 1820 is rotated and the actuator module 1810 changes orientation, the mobile component 1802 in the actuator module 1801 can change displacement 1850, relative to an equilibrium position 1807, due to the force of gravity acting upon the mobile component as the actuator module 1801 changes orientation. Changing displacement of the mobile component 1802 can include the mobile component moving within a full range of motion within the static component 1803 of the actuator module, and relative to the coil assembly 1804 and the Hall sensor 1806 coupled to the static component. Spring assemblies 1860 in the actuator module 1801 can restrict the range of motion of the mobile component 1802, relative to the static component 1803. As the mobile component 1802 changes displacement, the magnetic field generated by a magnet included in the mobile component changes position, relative to the Hall sensor 1806. As a result, the voltage strength of the output signal generated by the Hall sensor 1806 can change over time as the mobile component 1802 changes displacement due to the force of gravity. Because mobile component displacement is caused by gravity and not applied electrical current, the output signals generated by the Hall sensor 606 can be free of coil assembly corruption.

At 1804, mobile component displacement ("X") and voltage strength of output signals generated by a Hall sensor of the actuator module ("V") are tracked during the time period at which the orientation of the one or more portions of the support structure re varied according to a pattern. Displacement can be measured via data received from the position sensor which directly measures displacement of the mobile component.

In some embodiments, where the actuator module comprises a camera module where the mobile component comprises an optics component (e.g., an optical lens), the position sensor 1830 can comprise a collimated light source which is coupled to the support structure and is aligned to a overfill the optics component when the mobile component is positioned at a particular position in the actuator module, including the equilibrium position. As the mobile component is displaced from the particular position, the position of the optics component relative to the collimated light source can change. As a result, the position sensor can comprise a sensor of the camera module which detects light passing through the optics component from the collimated light source. Output signals can be measured via data received from a Hall sensor driver of the actuator module which receives output signals generated by the Hall sensor.

Figure 19:
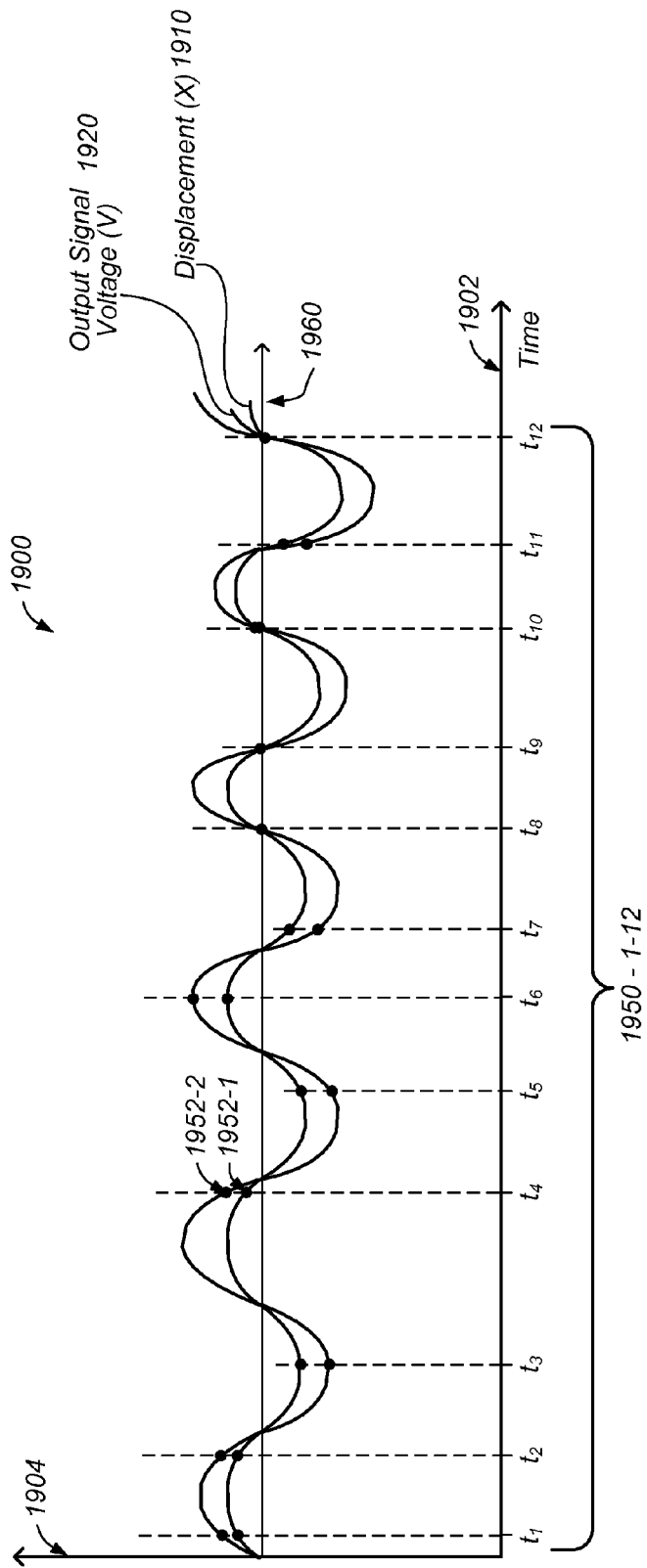
FIG. 19 illustrates a time-varying pattern of measured mobile component displacement and corresponding time-varying Hall sensor generated output signal voltage strength over a period of elapsed time during which actuator module orientation is being changed by a support structure in the absence of applied electrical current, according to some embodiments.

FIG. 19 illustrates a time-varying pattern 1900 of measured mobile component displacement 1910 and corresponding time-varying Hall sensor generated output signal voltage strength 1920 over a period of elapsed time 1902 during which actuator module orientation is being changed by a support structure in the absence of applied electrical current, according to some embodiments. In the illustrated embodiment, a sinusoidal time-varying pattern of mobile component displacement 1910 is applied over a period of time, and the generated output signals 1910, 1920 similarly vary in sinusoidal patterns.

In some embodiments, at least one set of displacement and voltage measurements are recorded synchronously, such that the measurements represent a respective portion of the actuator module at a common period in time. Multiple sets of synchronous measurements can be recorded over a period of time. As shown in FIG. 19, multiple sets of measurements 1950-1-12 can be recorded over time 1902 during which the mobile component displacement 1910 is varied according to a pattern. Each set 1950 comprises synchronous measurements of mobile component displacement from an equilibrium position 1952-1 and output signal voltage strength 1952-2. As shown, the various sets 1950 of measurements can be recorded at various time intervals, intermittently, and random intervals, some combination thereof, or the like.

Figure 20:
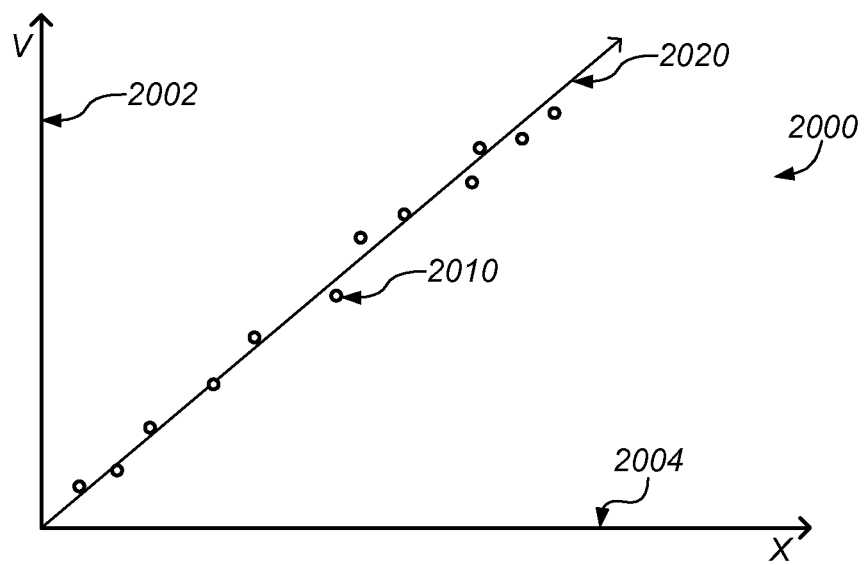
FIG. 20 illustrates a graphical representation of multiple synchronous measurements of mobile component displacement against generated Hall sensor output signal voltage strength, where electrical current is constant, and a linear curve fit of the various synchronous measurements which represents a linear relationship between mobile component displacement and output signal with a constant strength of applied electrical current, according to some embodiments.

FIG. 20 illustrates a graphical representation 2000 of multiple synchronous measurements 2010 of mobile component displacement 2004 against generated Hall sensor output signal voltage strength 2002, where electrical current is constant, and a linear curve fit 2020 of the various synchronous measurements which represents a linear relationship between mobile component displacement and output signal with a constant strength of applied electrical current, according to some embodiments. In some embodiments, the curve fit is a least-squares fit of a linear relationship. At 1706, the displacement coefficient ("C1") and current coefficient ("C2") can be estimated, as respective values C1' and C2', based at least in part upon the sets of synchronous displacement and voltage measurements at 1704. In some embodiments, based at least in part upon equations (7) and (8), C2 can be estimated based on the following relationship:

$$C2'=D1*[1-(C1'/D1)]*B1 \qquad (13)$$

Based at least in part upon the estimated coefficient values (C1', C2'), an offset signal can be determined as illustrated in 846 of FIG. 8.

In some embodiments, determination of C1' and C2' includes determining a curve fit of multiple sets of synchronous measurements of voltage and displacement. In some embodiments, determining a curve fit comprises a least squares fit of a linear relationship between signal voltage and displacement.

Transfer Function Control Calibration

In some embodiments, one or more of the displacement coefficient C1 and current coefficient C2 are estimated as C1' and C2', respectively, via a transfer function control process where one or more of C1, C2, etc. is iteratively estimated and transfer functions which utilize a corrected output signal voltage ("VHall'") to estimate mobile component displacement, based on the estimated coefficient values, are verified for accuracy with transfer functions which utilize direct measurements of mobile component displacement. Such a transfer function control process can be implemented in alternative to the process illustrated at 806 in FIG. 8.

Figure 21:
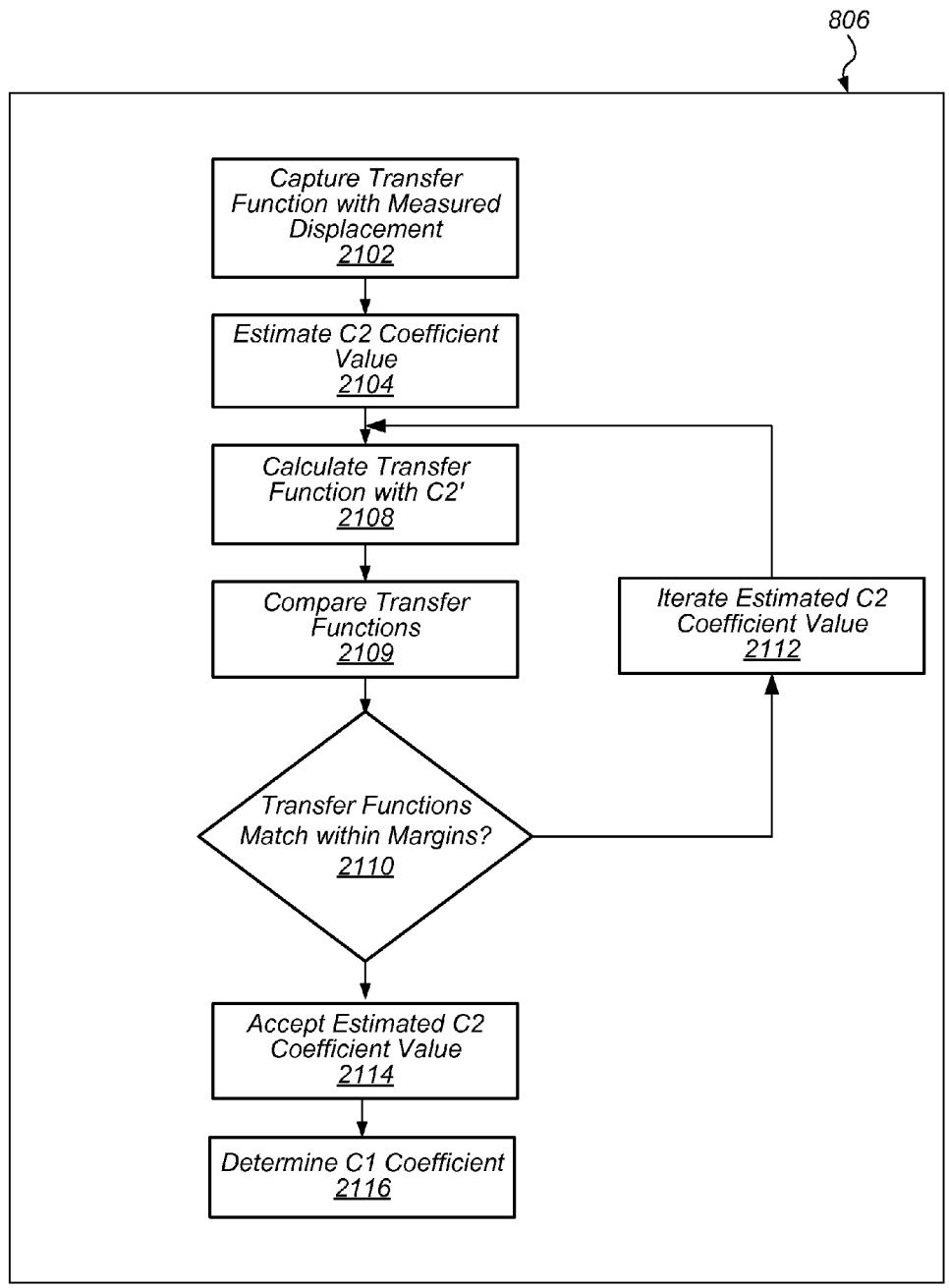
FIG. 21 illustrates utilizing transfer functions associated with the actuator module to calibrate an actuator module to correct for coil assembly field corruption of Hall sensor output signals, so that the output signals can be used to accurately determine displacement of a mobile component in the actuator module, according to some embodiments.

FIG. 21 illustrates utilizing transfer functions associated with the actuator module to calibrate an actuator module to correct for coil assembly field corruption of Hall sensor output signals, so that the output signals can be used to accurately determine displacement of a mobile component in the actuator module, according to some embodiments. The illustrated utilization, as shown in FIG. 21, is a process 806 which can be implemented as process 806 in FIG. 8, in alternative to the process 806 illustrated in FIG. 8.

Figure 22A:
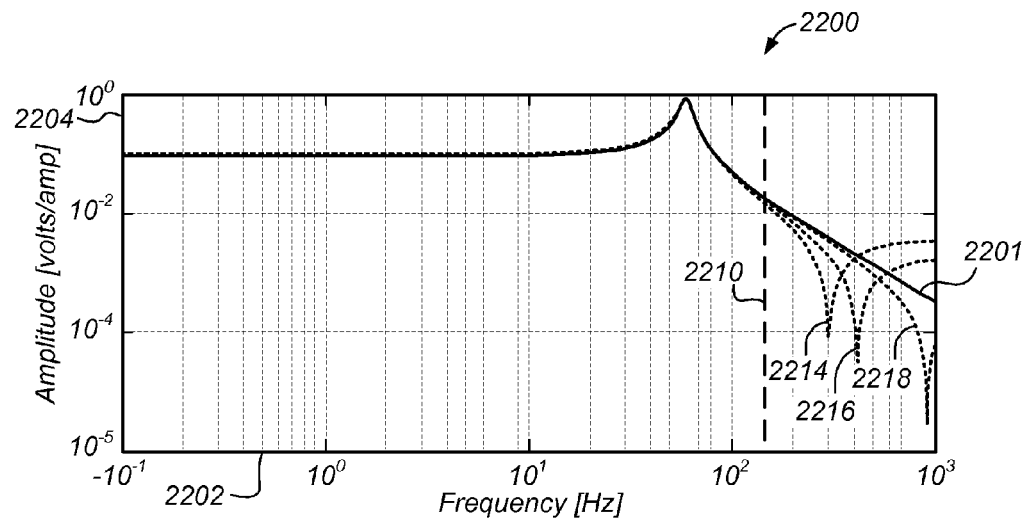
FIG. 22A and FIG. 22B illustrate Bode plots associated with the actuator module, based at least in part upon direct measurements of mobile component displacement and estimation of corrected output signal voltage coefficient values, according to some embodiments.
Figure 22B:
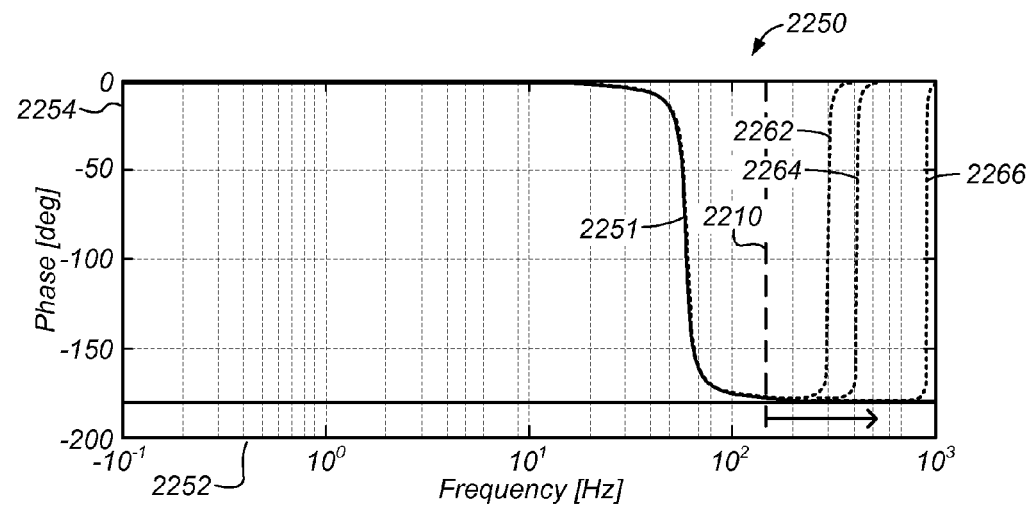

FIG. 22A and FIG. 22B illustrate Bode plots associated with the actuator module, based at least in part upon direct measurements of mobile component displacement and estimation of corrected output signal voltage coefficient values, according to some embodiments.

At 2102, a first set of Bode plots of a mobile component in an actuator module are captured based at least in part upon direct measurements of mobile component displacement. As shown in FIG. 22A and FIG. 22B, plots 2201, 2251 can be generated based on frequency associated with applied electrical current. As shown in the illustrated FIGS. 22A and 22B, in some embodiments an actuator module comprises a mobile component which switches phase approximately at a resonance frequency 2210. Similarly, as shown, the gain 2204 of the mobile component can drop with increasing frequency 2202 approximately at the frequency at which phase 2254 begins to switch.

At 2106, a value of coefficient C2 is estimated as C2'. Upon estimating C2', an estimated value of the motion fraction "A" can be estimated, modifying equation (8) as follows:

$$A = 1 - (C2'/(D1*B1)) \quad (14)$$

Based on the estimation of the motion fraction "A", the value of C1' can be determined via equation (7).

At 2108, a second set of Bode plots are captured for the actuator module, where the estimated plots are generated based at least in part upon output signals generated by the Hall sensor of the actuator module and an estimation of the mobile component displacement based on the output signals and the estimated values of C1 and C2, via equations (2) and (3).

At 2109, the second set of Bode plots is compared for accuracy to the first set of Bode plots. As the first set of plots are captured based on direct measurements of mobile component displacement, and the second set of plots are captured based on estimations of mobile component displacement based on correction for coil assembly corruption of a Hall sensor output signal, the comparison determines whether the estimated value of C2 at 2108 results in a set of plots which matches the first set of plots with sufficient accuracy. Sufficient accuracy can refer to the first and second set of plots matching, within a certain threshold margin (e.g., 0.01%) across a certain range of frequencies of the Bode plots (e.g., 1-10,000 Hz). At 2110 and 2112, if the plots do not match with sufficient accuracy, the value of C2 is iteratively revised, and the resulting plots compared against the first set of plots, until the sufficient accuracy is achieved, at which point the value of C2' which results in a sufficiently accurate set of plots is accepted, and the resulting value of C1' which is calculated via equation (7) is accepted. Based at least in part upon the estimated coefficient values (C1', C2'), an offset signal can be determined as illustrated in 846 of FIG. 8.

In FIG. 22A-B, multiple "second" sets of Bode plots are illustrated in each figure, where each set of Bode plots results from a particular estimated value of C2'. As shown, the plots resulting from output signal voltages 2212-2216, 2262-2266 deviate from the first set of Bode plots beyond certain frequencies. In particular, although the Bode plots appear to match closely at frequencies below that of resonance 2210, above resonance the plots deviate, with the frequency of the deviation varying depending upon accuracy of the estimated C2 value used to generate the respective "second" Bode plots.

For example, in FIG. 22A, gain of "second" Bode plots 2212-2216 spikes downwards from that of "first" Bode plot 2210 as frequency 2202 increases beyond resonance. However, the frequency at which the spike occurs increases with the accuracy of the C2' value associated with the respective "second" Bode plots. For example, plots 2212, 2214, 2216 are based upon respectively more accurate C2' values, and therefore feature spikes at progressively greater frequency 2202. As a result, the Bode plot 2216 which is based on the most accurate C2' estimation matches the first Bode plot 2210 across a greater range of frequency 2202 than the Bode plot 2212 which is based on the least accurate C2' estimation. In addition, in some embodiments the Bode plot 2216 matches function 2210 with sufficient accuracy across a certain range of frequencies 2202; as a result, the C2' value used to calculate the Bode plot 2216 can be accepted.

In another example, in FIG. 22B, phase of "second" Bode plots 2262-2266 drop from zero degrees to −180 degrees, similarly to the first function plot 2251, at resonance but then rise, at progressively greater frequencies above resonance, back to zero degrees. However, the frequency at which the plot rise occurs increases with the accuracy of the C2' value associated with the respective "second" Bode plot. For example, plots 2262, 2264, 2266 are based upon respectively more accurate C2' values, and therefore feature rises at progressively greater frequency 2252. As a result, the Bode plot 2266 which is based on the most accurate C2' estimation matches the first Bode plot 2251 across a greater range of frequency 2252 than the Bode plot 2262 which is based on the least accurate C2' estimation. In addition, in some embodiments the Bode plot 2266 matches plot 2251 with sufficient accuracy across a certain range of frequencies 2252; as a result, the C2' value used to calculate the Bode plot 2266 can be accepted.

In some embodiments, a linear relationship between voltage and applied current is present in a certain frequency range of the actuator mechanism. For example, where the amplitude frequency of an actuator mechanism ranges between 0-1000 Hz, the relationship between output signal voltages and applied electrical current strength can be linear across at least an amplitude frequency of ~0-50 Hz. In some embodiments, the ratio of voltage to current amperage can be constant across a particular range of amplitude frequencies.

Multifunction Device Examples

Embodiments of electronic devices in which embodiments of actuator modules 100 as described herein may be used, user interfaces for such devices, and associated processes for using such devices are described. As noted above, in some embodiments, an actuator module 100 is included in a camera device, a device which includes a camera device, etc. In some embodiments, the device is a portable communications device, such as a mobile telephone, that also contains other functions, such as PDA and/or music player functions. Other portable electronic devices, such as laptops, cell phones, pad devices, or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera device.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 23:
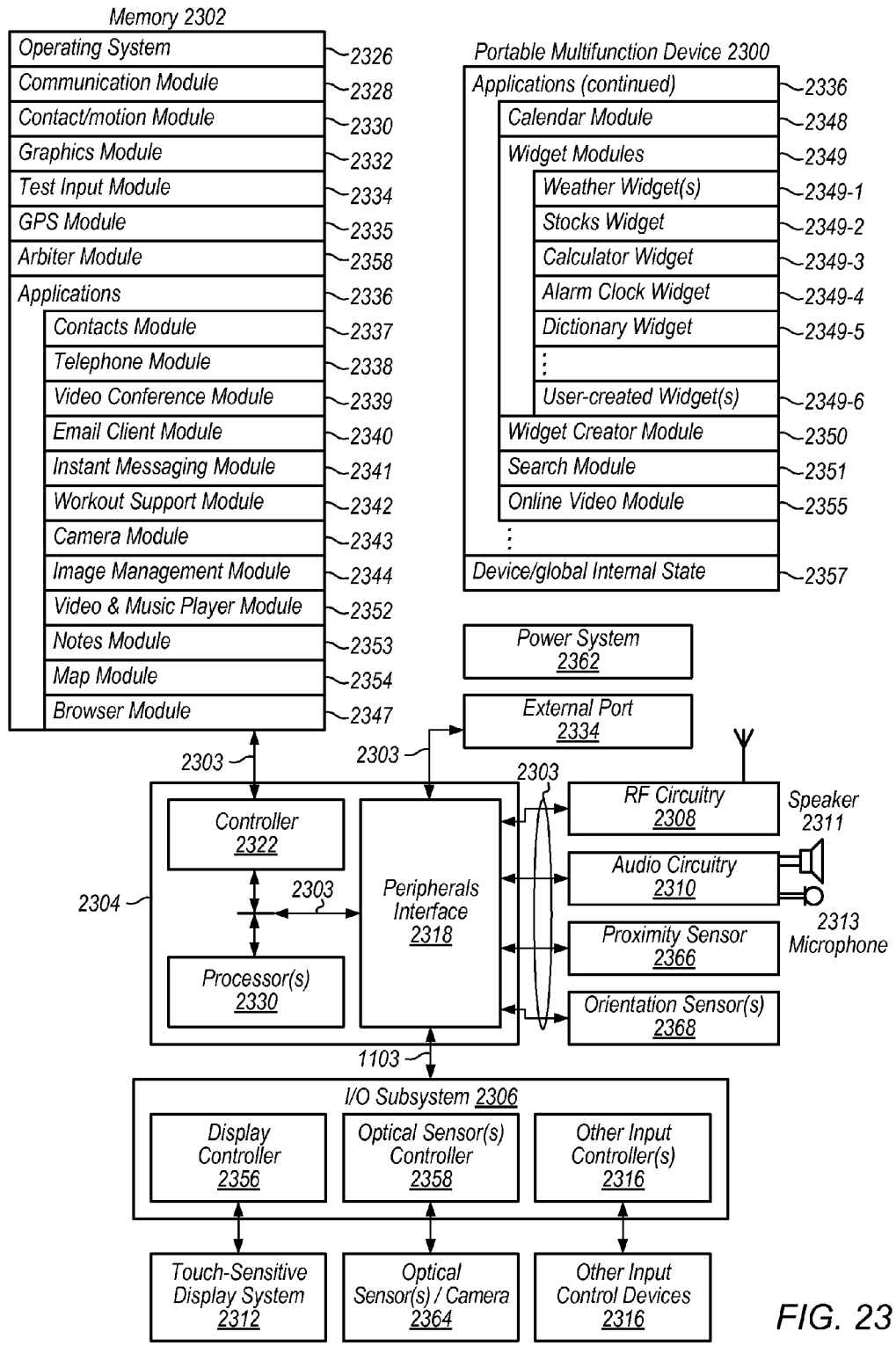
FIG. 23 is a block diagram illustrating portable multifunction device with camera in accordance with some embodiments.

Attention is now directed toward embodiments of portable devices with cameras. FIG. 23 is a block diagram illustrating portable multifunction device 2300 with camera 2364 in accordance with some embodiments. Camera 2364 is sometimes called an "optical sensor" for convenience, and may also be known as or called an optical sensor system. Embodiments of an actuator module 100, 700, etc., including one or more actuator modules that includes passive damping for auto-focusing, may be used in the optical sensor/camera(s) 2364 of a device 2300.

Device 2300 may include memory 2302 (which may include one or more computer readable storage mediums), memory controller 2322, one or more processing units (CPU's) 2320, peripherals interface 2318, RF circuitry 2308, audio circuitry 2310, speaker 2311, touch-sensitive display system 2312, microphone 2313, input/output (I/O) subsystem 2306, other input or control devices 2316, and external port 2324. Device 2300 may include one or more optical sensors 2364. These components may communicate over one or more communication buses or signal lines 2303.

It should be appreciated that device 2300 is only one example of a portable multifunction device, and that device 2300 may have more or fewer components than shown, may combine two or more components, or may have a different configuration or arrangement of the components. The various components shown in FIG. 23 may be implemented in hardware, software, or a combination of hardware and software, including one or more signal processing and/or application specific integrated circuits.

Memory 2302 may include high-speed random access memory and may also include non-volatile memory, such as one or more magnetic disk storage devices, flash memory devices, or other non-volatile solid-state memory devices. Access to memory 2302 by other components of device 2300, such as CPU 2320 and the peripherals interface 2318, may be controlled by memory controller 2322.

Peripherals interface 2318 can be used to couple input and output peripherals of the device to CPU 2320 and memory 2302. The one or more processors 2320 run or execute various software programs and/or sets of instructions stored in memory 2302 to perform various functions for device 2300 and to process data.

In some embodiments, peripherals interface 2318, CPU 2320, and memory controller 2322 may be implemented on a single chip, such as chip 2304. In some other embodiments, they may be implemented on separate chips.

RF (radio frequency) circuitry 2308 receives and sends RF signals, also called electromagnetic signals. RF circuitry 2308 converts electrical signals to/from electromagnetic signals and communicates with communications networks and other communications devices via the electromagnetic signals. RF circuitry 2308 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 2308 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wide-band code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 2310, speaker 2311, and microphone 2313 provide an audio interface between a user and device 2300. Audio circuitry 2310 receives audio data from peripherals interface 2318, converts the audio data to an electrical signal, and transmits the electrical signal to speaker 2311. Speaker 2311 converts the electrical signal to human-audible sound waves. Audio circuitry 2310 also receives electrical signals converted by microphone 2313 from sound waves. Audio circuitry 2310 converts the electrical signal to audio data and transmits the audio data to peripherals interface 2318 for processing. Audio data may be retrieved from and/or transmitted to memory 102 and/or RF circuitry 2308 by peripherals interface 2318. In some embodiments, audio circuitry 2310 also includes a headset jack (e.g., 2312, FIG. 23). The headset jack provides an interface between audio circuitry 2310 and removable audio input/output peripherals, such as output-only headphones or a headset with both output (e.g., a headphone for one or both ears) and input (e.g., a microphone).

I/O subsystem 2306 couples input/output peripherals on device 2300, such as touch screen 2312 and other input control devices 2316, to peripherals interface 2318. I/O subsystem 2306 may include display controller 2356 and one or more input controllers 2360 for other input or control devices. The one or more input controllers 160 receive/send electrical signals from/to other input or control devices 2316. The other input control devices 2316 may include physical buttons (e.g., push buttons, rocker buttons, etc.), dials, slider switches, joysticks, click wheels, and so forth. In some alternative embodiments, input controller(s) 2360 may be coupled to any (or none) of the following: a keyboard, infrared port, USB port, and a pointer device such as a mouse. The one or more buttons (e.g., 2308, FIG. 23) may include an up/down button for volume control of speaker 2311 and/or microphone 2313. The one or more buttons may include a push button (e.g., 2306, FIG. 23).

Touch-sensitive display 2312 provides an input interface and an output interface between the device and a user. Display controller 2356 receives and/or sends electrical signals from/to touch screen 2312. Touch screen 2312 displays visual output to the user. The visual output may include graphics, text, icons, video, and any combination thereof (collectively termed "graphics"). In some embodiments, some or all of the visual output may correspond to user-interface objects.

Touch screen 2312 has a touch-sensitive surface, sensor or set of sensors that accepts input from the user based on haptic and/or tactile contact. Touch screen 2312 and display controller 2356 (along with any associated modules and/or sets of instructions in memory 2302) detect contact (and any movement or breaking of the contact) on touch screen 2312 and converts the detected contact into interaction with user-interface objects (e.g., one or more soft keys, icons, web pages or images) that are displayed on touch screen 2312. In an example embodiment, a point of contact between touch screen 2312 and the user corresponds to a finger of the user.

Touch screen 2312 may use LCD (liquid crystal display) technology, LPD (light emitting polymer display) technology, or LED (light emitting diode) technology, although other display technologies may be used in other embodiments. Touch screen 2312 and display controller 2356 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 2312. In an example embodiment, projected mutual capacitance sensing technology may be used.

Touch screen 2312 may have a video resolution in excess of 100 dots per inch (dpi). In some embodiments, the touch screen has a video resolution of approximately 160 dpi. The user may make contact with touch screen 2312 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 2300 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 2312 or an extension of the touch-sensitive surface formed by the touch screen.

Device 2300 also includes power system 2362 for powering the various components. Power system 2362 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 2300 may also include one or more optical sensors or cameras 2364. FIG. 23 shows an optical sensor coupled to optical sensor controller 2358 in I/O subsystem 2306. Optical sensor 2364 may include charge-coupled device (CCD) or complementary metal-oxide semiconductor (CMOS) phototransistors. Optical sensor 2364 receives light from the environment, projected through one or more lens, and converts the light to data representing an image. In conjunction with imaging module 2343 (also called a camera module), optical sensor 2364 may capture still images or video. In some embodiments, an optical sensor is located on the back of device 2300, opposite touch screen display 2312 on the front of the device, so that the touch screen display may be used as a viewfinder for still and/or video image acquisition. In some embodiments, another optical sensor is located on the front of the device so that the user's image may be obtained for videoconferencing while the user views the other videoconference participants on the touch screen display.

Device 2300 may also include one or more proximity sensors 2366. FIG. 23 shows proximity sensor 2366 coupled to peripherals interface 2318. Alternatively, proximity sensor 2366 may be coupled to input controller 2360 in I/O subsystem 2306. In some embodiments, the proximity sensor turns off and disables touch screen 2312 when the multifunction device is placed near the user's ear (e.g., when the user is making a phone call).

Device 2300 includes one or more orientation sensors 2368. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 2300. In some embodiments, the one or more orientation sensors include any combination of orientation/rotation sensors. FIG. 23 shows the one or more orientation sensors 2368 coupled to peripherals interface 2318. Alternatively, the one or more orientation sensors 2368 may be coupled to an input controller 2360 in I/O subsystem 2306. In some embodiments, information is displayed on the touch screen display in a portrait view or a landscape view based on an analysis of data received from the one or more orientation sensors.

In some embodiments, the software components stored in memory 2302 include operating system 2326, communication module (or set of instructions) 2328, contact/motion module (or set of instructions) 2330, graphics module (or set of instructions) 2332, text input module (or set of instructions) 2334, Global Positioning System (GPS) module (or set of instructions) 2335, arbiter module 2357 and applications (or sets of instructions) 2336. Furthermore, in some embodiments memory 2302 stores device/global internal state 2357. Device/global internal state 2357 includes one or more of: active application state, indicating which applications, if any, are currently active; display state, indicating what applications, views or other information occupy various regions of touch screen display 2312; sensor state, including information obtained from the device's various sensors and input control devices 2316; and location information concerning the device's location and/or attitude.

Operating system 2326 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 2328 facilitates communication with other devices over one or more external ports 2324 and also includes various software components for handling data received by RF circuitry 2308 and/or external port 2324. External port 2324 (e.g., Universal Serial Bus (USB), FIREWIRE, etc.) is adapted for coupling directly to other devices or indirectly over a network (e.g., the Internet, wireless LAN, etc.).

Contact/motion module 2330 may detect contact with touch screen 2312 (in conjunction with display controller 2356) and other touch sensitive devices (e.g., a touchpad or physical click wheel). Contact/motion module 2330 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 2330 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 2330 and display controller 2356 detect contact on a touchpad.

Contact/motion module 2330 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 2332 includes various known software components for rendering and displaying graphics on touch screen 2312 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 2332 stores data representing graphics to be used. Each graphic may be assigned a corresponding code. Graphics module 2332 receives, from applications etc., one or more codes specifying graphics to be displayed along with, if necessary, coordinate data and other graphic property data, and then generates screen image data to output to display controller 2356.

Text input module 2334, which may be a component of graphics module 2332, provides soft keyboards for entering text in various applications (e.g., contacts 2337, e-mail 2340, IM 141, browser 2347, and any other application that needs text input).

GPS module 2335 determines the location of the device and provides this information for use in various applications (e.g., to telephone 2338 for use in location-based dialing, to camera module 2343 as picture/video metadata, and to applications that provide location-based services such as weather widgets, local yellow page widgets, and map/navigation widgets).

Applications 2336 may include the following modules (or sets of instructions), or a subset or superset thereof:
  contacts module 2337 (sometimes called an address book or contact list);
  telephone module 2338;
  video conferencing module 2339;
  e-mail client module 2340;
  instant messaging (IM) module 2341;
  workout support module 2342;
  camera module 2343 for still and/or video images;
  image management module 2344;
  browser module 2347;
  calendar module 2348;
  widget modules 2349, which may include one or more of: weather widget 2349-1, stocks widget 2349-2, calculator widget 2349-3, alarm clock widget 2349-4, dictionary widget 2349-5, and other widgets obtained by the user, as well as user-created widgets 2349-6;
  widget creator module 2350 for making user-created widgets 2349-6;
  search module 2351;
  video and music player module 2352, which may be made up of a video player module and a music player module;
notes module 2353;
map module 2354; and/or
online video module 2355.

Examples of other applications 2336 that may be stored in memory 2302 include other word processing applications, other image editing applications, drawing applications, presentation applications, JAVA-enabled applications, encryption, digital rights management, voice recognition, and voice replication.

In conjunction with touch screen 2312, display controller 2356, contact module 2330, graphics module 2332, and text input module 2334, contacts module 2337 may be used to manage an address book or contact list (e.g., stored in application internal state 2392 of contacts module 2337 in memory 2302), including: adding name(s) to the address book; deleting name(s) from the address book; associating telephone number(s), e-mail address(es), physical address (es) or other information with a name; associating an image with a name; categorizing and sorting names; providing telephone numbers or e-mail addresses to initiate and/or facilitate communications by telephone 2338, video conference 2339, e-mail 2340, or IM 2341; and so forth.

In conjunction with RF circuitry 2308, audio circuitry 2310, speaker 2311, microphone 2313, touch screen 2312, display controller 2356, contact module 2330, graphics module 2332, and text input module 2334, telephone module 2338 may be used to enter a sequence of characters corresponding to a telephone number, access one or more telephone numbers in address book 2337, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 2308, audio circuitry 2310, speaker 2311, microphone 2313, touch screen 2312, display controller 2356, optical sensor 2364, optical sensor controller 2358, contact module 2330, graphics module 2332, text input module 2334, contact list 2337, and telephone module 2338, videoconferencing module 239 includes executable instructions to initiate, conduct, and terminate a video conference between a user and one or more other participants in accordance with user instructions.

In conjunction with RF circuitry 2308, touch screen 2312, display controller 2356, contact module 2330, graphics module 2332, and text input module 2334, e-mail client module 2340 includes executable instructions to create, send, receive, and manage e-mail in response to user instructions. In conjunction with image management module 2344, e-mail client module 2340 makes it very easy to create and send e-mails with still or video images taken with camera module 2343.

In conjunction with RF circuitry 2308, touch screen 2312, display controller 2356, contact module 2330, graphics module 2332, and text input module 2334, the instant messaging module 2341 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 2308, touch screen 2312, display controller 2356, contact module 2330, graphics module 2332, text input module 2334, GPS module 2335, map module 2354, and music player module 2346, workout support module 2342 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 2312, display controller 2356, optical sensor(s) 2364, optical sensor controller 2358, contact module 2330, graphics module 2332, and image management module 2344, camera module 2343 includes executable instructions to capture still images or video (including a video stream) and store them into memory 2302, modify characteristics of a still image or video, or delete a still image or video from memory 2302.

In conjunction with touch screen 2312, display controller 2356, contact module 2330, graphics module 2332, text input module 2334, and camera module 2343, image management module 2344 includes executable instructions to arrange, modify (e.g., edit), or otherwise manipulate, label, delete, present (e.g., in a digital slide show or album), and store still and/or video images.

In conjunction with RF circuitry 2308, touch screen 2312, display system controller 2356, contact module 2330, graphics module 2332, and text input module 2334, browser module 2347 includes executable instructions to browse the Internet in accordance with user instructions, including searching, linking to, receiving, and displaying web pages or portions thereof, as well as attachments and other files linked to web pages.

In conjunction with RF circuitry 2308, touch screen 2312, display system controller 2356, contact module 2330, graphics module 2332, text input module 2334, e-mail client module 2340, and browser module 2347, calendar module 2348 includes executable instructions to create, display, modify, and store calendars and data associated with calendars (e.g., calendar entries, to do lists, etc.) in accordance with user instructions.

In conjunction with RF circuitry 2308, touch screen 2312, display system controller 2356, contact module 2330, graphics module 2332, text input module 2334, and browser module 2347, widget modules 2349 are mini-applications that may be downloaded and used by a user (e.g., weather widget 2349-1, stocks widget 2349-2, calculator widget 23493, alarm clock widget 2349-4, and dictionary widget 2349-5) or created by the user (e.g., user-created widget 2349-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 2308, touch screen 2312, display system controller 2356, contact module 2330, graphics module 2332, text input module 2334, and browser module 2347, the widget creator module 2350 may be used by a user to create widgets (e.g., turning a user-specified portion of a web page into a widget).

In conjunction with touch screen 2312, display system controller 2356, contact module 2330, graphics module 2332, and text input module 2334, search module 2351 includes executable instructions to search for text, music, sound, image, video, and/or other files in memory 2302 that match one or more search criteria (e.g., one or more user-specified search terms) in accordance with user instructions.

In conjunction with touch screen 2312, display system controller 2356, contact module 2330, graphics module 2332, audio circuitry 2310, speaker 2311, RF circuitry 2308, and browser module 2347, video and music player module 2352 includes executable instructions that allow the user to download and play back recorded music and other sound files stored in one or more file formats, such as MP3 or AAC files, and executable instructions to display, present or otherwise play back videos (e.g., on touch screen 2312 or on an external, connected display via external port 2324). In some embodiments, device 2300 may include the functionality of an MP3 player.

In conjunction with touch screen 2312, display controller 2356, contact module 2330, graphics module 2332, and text input module 2334, notes module 2353 includes executable instructions to create and manage notes, to do lists, and the like in accordance with user instructions.

In conjunction with RF circuitry 2308, touch screen 2312, display system controller 2356, contact module 2330, graphics module 2332, text input module 2334, GPS module 2335, and browser module 2347, map module 2354 may be used to receive, display, modify, and store maps and data associated with maps (e.g., driving directions; data on stores and other points of interest at or near a particular location; and other location-based data) in accordance with user instructions.

In conjunction with touch screen 2312, display system controller 2356, contact module 2330, graphics module 2332, audio circuitry 2310, speaker 2311, RF circuitry 2308, text input module 2334, e-mail client module 2340, and browser module 2347, online video module 2355 includes instructions that allow the user to access, browse, receive (e.g., by streaming and/or download), play back (e.g., on the touch screen or on an external, connected display via external port 2324), send an e-mail with a link to a particular online video, and otherwise manage online videos in one or more file formats, such as H.264. In some embodiments, instant messaging module 2341, rather than e-mail client module 2340, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 2302 may store a subset of the modules and data structures identified above. Furthermore, memory 2302 may store additional modules and data structures not described above.

In some embodiments, device 2300 is a device where operation of a predefined set of functions on the device is performed exclusively through a touch screen and/or a touchpad. By using a touch screen and/or a touchpad as the primary input control device for operation of device 2300, the number of physical input control devices (such as push buttons, dials, and the like) on device 2300 may be reduced.

The predefined set of functions that may be performed exclusively through a touch screen and/or a touchpad include navigation between user interfaces. In some embodiments, the touchpad, when touched by the user, navigates device 2300 to a main, home, or root menu from any user interface that may be displayed on device 2300. In such embodiments, the touchpad may be referred to as a "menu button." In some other embodiments, the menu button may be a physical push button or other physical input control device instead of a touchpad.

Figure 24:
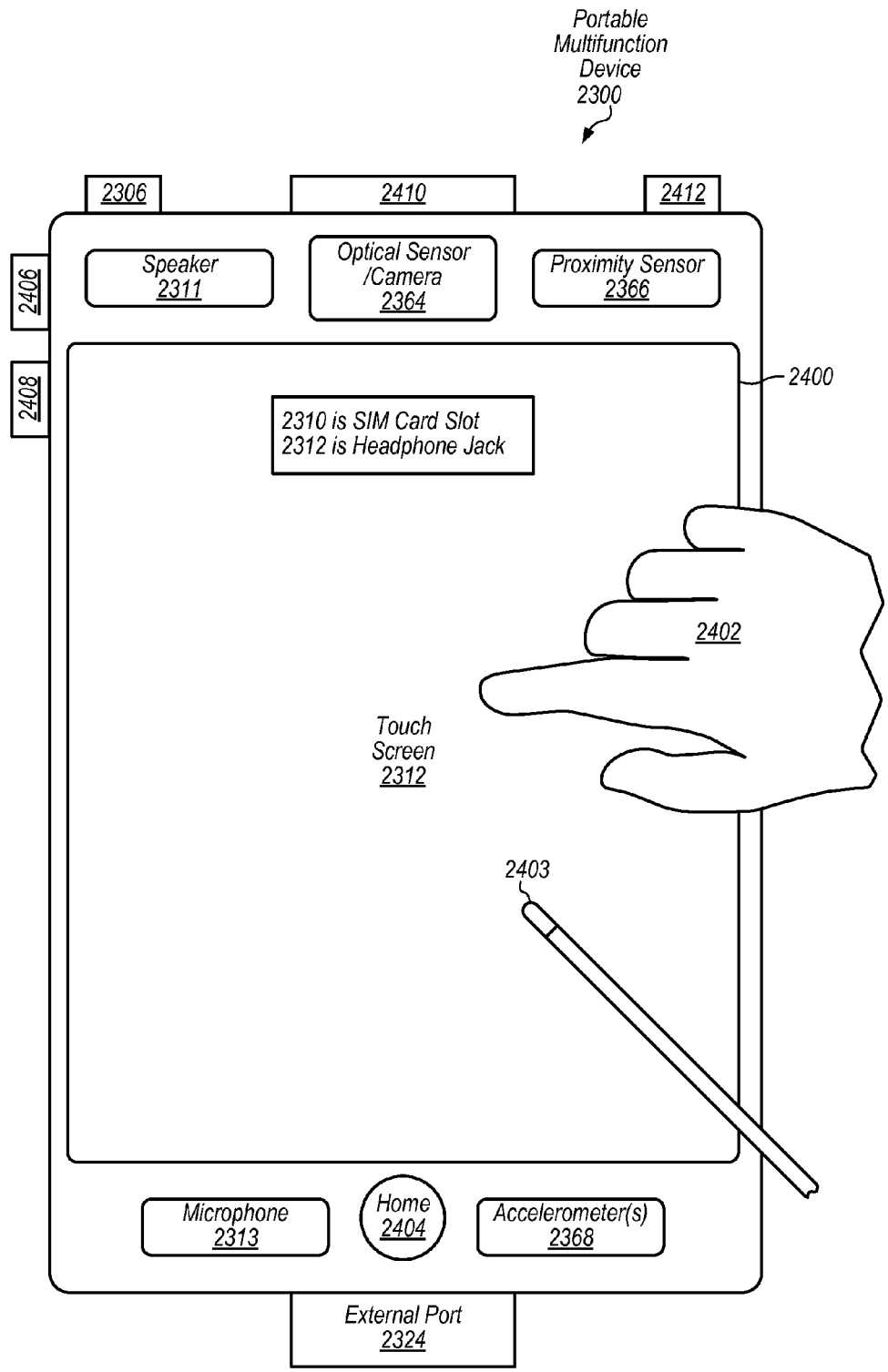
FIG. 24 illustrates a portable multifunction device having a touch screen in accordance with some embodiments.

FIG. 24 illustrates a portable multifunction device 2300 having a touch screen 2312 in accordance with some embodiments. The touch screen may display one or more graphics within user interface (UI) 2400. In this embodiment, as well as others described below, a user may select one or more of the graphics by making a gesture on the graphics, for example, with one or more fingers 2402 (not drawn to scale in the Figure) or one or more styluses 2403 (not drawn to scale in the figure).

Device 2300 may also include one or more physical buttons, such as "home" or menu button 2404. As described previously, menu button 2404 may be used to navigate to any application 2336 in a set of applications that may be executed on device 2300. Alternatively, in some embodiments, the menu button is implemented as a soft key in a graphics user interface (GUI) displayed on touch screen 2312.

In one embodiment, device 2300 includes touch screen 2312, menu button 2404, push button 2406 for powering the device on/off and locking the device, volume adjustment button(s) 2408, Subscriber Identity Module (SIM) card slot 2410, head set jack 2412, and docking/charging external port 2324. Push button 2406 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 2300 also may accept verbal input for activation or deactivation of some functions through microphone 2313.

It should be noted that, although many of the examples herein are given with reference to optical sensor/camera 2364 (on the front of a device), a rear-facing camera or optical sensor that is pointed opposite from the display may be used instead of or in addition to an optical sensor/camera 2364 on the front of a device. Embodiments of an actuator module 100 that includes passive damping for optical image stabilization (OIS) may be used in the optical sensor/camera(s) 2364.

Example Computer System

Figure 25:
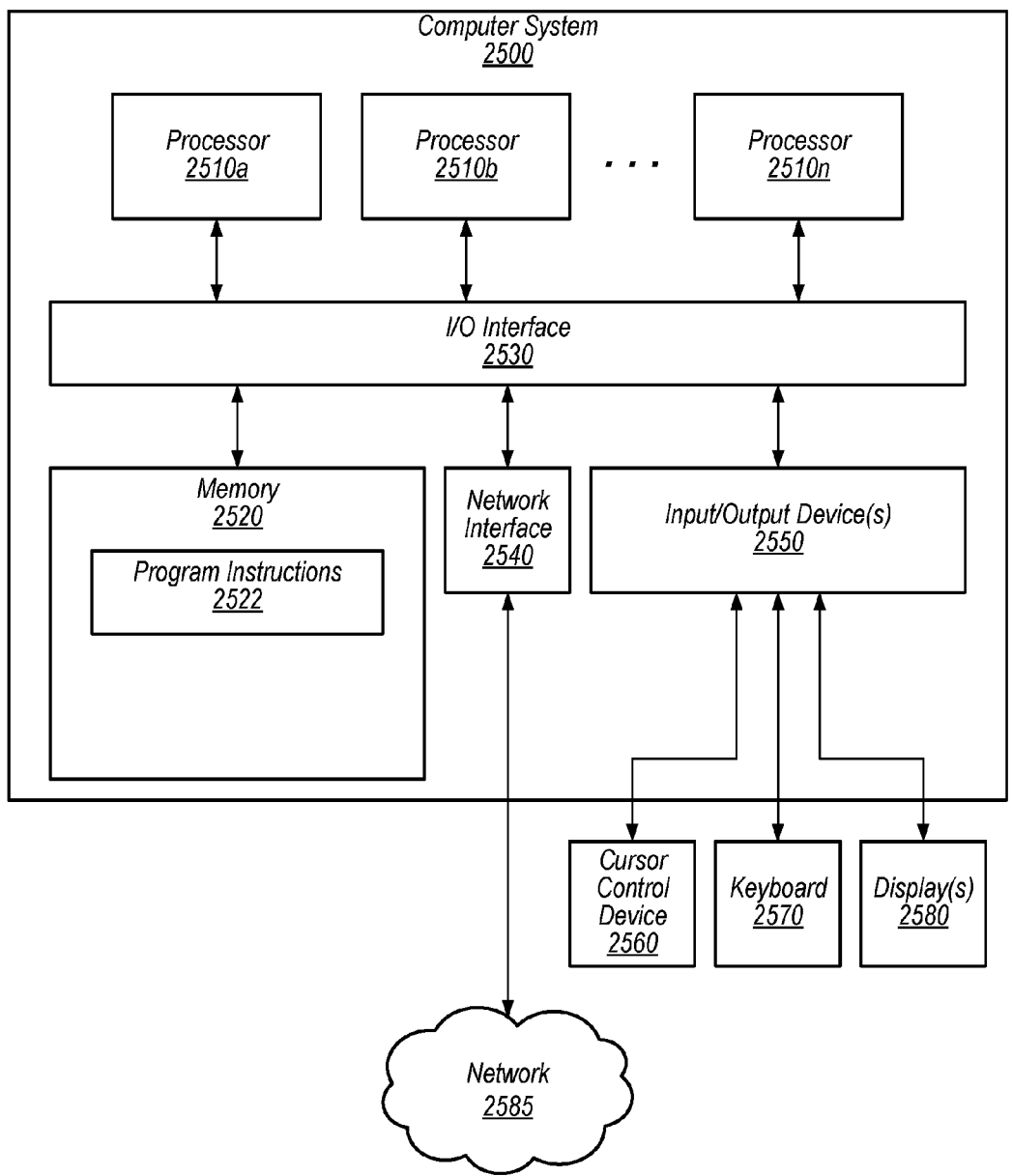
FIG. 25 illustrates an example computer system that may be configured to include or execute any or all of the embodiments described above.

FIG. 25 illustrates an example computer system 2500 that may be configured to include or execute any or all of the embodiments described above. In different embodiments, computer system 2500 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, may be executed in one or more computer systems 2500, which may interact with various other devices. Note that any component, action, or functionality described above with respect to FIGS. 1 through 24 may be implemented on one or more computers configured as computer system 2500 of FIG. 25, according to various embodiments. In the illustrated embodiment, computer system 2500 includes one or more processors 2510 coupled to a system memory 2520 via an input/output (I/O) interface 2530. Computer system 2500 further includes a network interface 2540 coupled to I/O interface 2530, and one or more input/output devices 2550, such as cursor control device 2560, keyboard 2570, and display(s) 2580. In some cases, it is contemplated that embodiments may be implemented using a single instance of computer system 2500, while in other embodiments multiple such systems, or multiple nodes making up computer system 2500, may be configured to host different portions or instances of embodiments. For example, in one embodiment some elements may be implemented via one or more nodes of computer system 2500 that are distinct from those nodes implementing other elements.

In various embodiments, computer system 2500 may be a uniprocessor system including one processor 2510, or a multiprocessor system including several processors 2510 (e.g., two, four, eight, or another suitable number). Processors 2510 may be any suitable processor capable of executing instructions. For example, in various embodiments processors 2510 may be general-purpose or embedded processors implementing any of a variety of instruction set architectures (ISAs), such as the x8 25, PowerPC, SPARC, or MIPS ISAs, or any other suitable ISA. In multiprocessor systems, each of processors 2510 may commonly, but not necessarily, implement the same ISA.

System memory 2520 may be configured to store camera control program instructions 2522 and/or camera control data accessible by processor 2510. In various embodiments, system memory 2520 may be implemented using any suitable memory technology, such as static random access memory (SRAM), synchronous dynamic RAM (SDRAM), nonvolatile/Flash-type memory, or any other type of memory. In the illustrated embodiment, program instructions 2522 may be configured to implement a lens control application incorporating any of the functionality described above. Additionally, program instructions 2522 of memory 2520 may include any of the information or data structures described above. In some embodiments, program instructions and/or data may be received, sent or stored upon different types of computer-accessible media or on similar media separate from system memory 2520 or computer system 2500. While computer system 2500 is described as implementing the functionality of functional blocks of previous Figures, any of the functionality described herein may be implemented via such a computer system.

In one embodiment, I/O interface 2530 may be configured to coordinate I/O traffic between processor 2510, system memory 2520, and any peripheral devices in the device, including network interface 2540 or other peripheral interfaces, such as input/output devices 2550. In some embodiments, I/O interface 2530 may perform any necessary protocol, timing or other data transformations to convert data signals from one component (e.g., system memory 2520) into a format suitable for use by another component (e.g., processor 2510). In some embodiments, I/O interface 2530 may include support for devices attached through various types of peripheral buses, such as a variant of the Peripheral Component Interconnect (PCI) bus standard or the Universal Serial Bus (USB) standard, for example. In some embodiments, the function of I/O interface 2530 may be split into two or more separate components, such as a north bridge and a south bridge, for example. Also, in some embodiments some or all of the functionality of I/O interface 2530, such as an interface to system memory 2520, may be incorporated directly into processor 2510.

Network interface 2540 may be configured to allow data to be exchanged between computer system 2500 and other devices attached to a network 2585 (e.g., carrier or agent devices) or between nodes of computer system 2500. Network 2585 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2550 may, in some embodiments, include one or more display terminals, keyboards, keypads, touchpads, scanning devices, voice or optical recognition devices, or any other devices suitable for entering or accessing data by one or more computer systems 2500. Multiple input/output devices 2550 may be present in computer system 2500 or may be distributed on various nodes of computer system 2500. In some embodiments, similar input/output devices may be separate from computer system 2500 and may interact with one or more nodes of computer system 2500 through a wired or wireless connection, such as over network interface 2540.

As shown in FIG. 25, memory 2520 may include program instructions 2522, which may be processor-executable to implement any element or action described above. In one embodiment, the program instructions may implement the methods described above. In other embodiments, different elements and data may be included. Note that data may include any data or information described above.

Those skilled in the art will appreciate that computer system 2500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2500 may be transmitted to computer system 2500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:
configuring a controller device of a Lorentz actuator module, wherein the Lorentz actuator module comprises a magnet, a coil assembly configured to generate Lorentz forces which cause displacement of the magnet based at least in part upon an applied electrical current, and a Hall sensor, to determine magnet displacement based at least in part upon a voltage of an output signal generated by the Hall sensor, wherein the configuring comprises:
estimating a current coefficient indicating a proportion of a given output signal voltage which is associated with a coil assembly magnetic field generated at the coil assembly based at least in part upon the applied electrical current; and
estimating an offset of a voltage of a given output signal voltage, based at least in part upon the current coefficient and a given applied electrical current strength, which removes a portion of the given output signal voltage associated with the coil assembly magnetic field and outputs a corrected output signal voltage is associated with displacement of the magnet and is independent of the coil assembly magnetic field.

2. The method of claim 1, wherein the configuring comprises:
commanding application of a time-varying electrical current profile which causes a corresponding time-varying displacement profile of the magnet, based at least in part upon Lorentz forces generated at the coil assembly;
generating a time-varying plurality of sets of synchronously-recorded output signal voltage, applied electrical current strength, and magnet displacement concurrently with application of the time-varying displacement profile of the magnet; and
estimating, based at least in part upon the generated time-varying plurality of sets of synchronously-recorded output signal voltage, applied electrical current strength, and magnet displacement:
an actuator coefficient which represents a determined linear relationship fit between measured applied electrical current strength and measured magnet displacement,
a corrupted signal coefficient which represents a determined linear relationship fit between measured output signal voltage and measured magnet displacement,
a voltage signal offset which represents a determined output signal voltage corresponding with an absence of applied electrical current, and
a displacement offset which represents a determined magnet displacement corresponding with an absence of applied electrical current.

3. The method of claim 2, wherein estimating the current coefficient comprises:
commanding application of electrical current to the coil assembly, such that the magnet is caused to be displaced from an equilibrium position to a first position;
recording a first output signal voltage, concurrently with application of electrical current to the coil assembly and the magnet remaining in a stable displacement at the first position;
commanding termination of electrical current application to the coil assembly;
recording a second output signal voltage subsequent to the termination of electrical current application and prior to a change in the magnet displacement from the first position; and
estimating the current coefficient based at least in part upon a ratio of the second output signal voltage to the first output signal voltage, the corrupted signal coefficient, and the actuator coefficient.

4. The method of claim 3, wherein:
the configuring comprises estimating a displacement coefficient indicating a proportion of the given output signal voltage which is associated with displacement of the magnet relative to the Hall sensor, based at least in part upon the ratio of the second output signal voltage to the first output voltage and the corrupted signal coefficient, independently of the actuator coefficient.

5. The method of claim 1, wherein:
the configuring comprises estimating a displacement coefficient indicating a proportion of the given output signal voltage which is associated with displacement of the magnet relative to the Hall sensor; and
estimating the displacement coefficient comprises:

measuring a first output signal voltage, concurrently with an absence of applied electrical current and an absence of magnet displacement from an equilibrium position, such that the measured first output signal voltage represents an offset voltage signal independent of both magnet displacement and applied electrical current;

causing a displacement of the magnet independently of applied electrical current;

measuring a magnitude of the magnet displacement;

measuring a second output signal voltage, concurrently with measuring the displacement, such that the measured second output signal voltage is independent of any coil assembly magnetic field; and estimating the displacement coefficient, based at least in part upon the measured first output signal voltage, measured second output signal voltage, and measured magnet displacement magnitude.

6. The method of claim 5, wherein:

the Lorentz actuator module is mounted to a support structure which is configured to be adjusted to a plurality of orientations in at least one dimension; and causing a displacement of the magnet independently of applied electrical current comprises commanding an actuator associated with the support structure to adjust support structure orientation in at least one dimension.

7. The method of claim 1, wherein estimating the current coefficient comprises:

coupling a clamp apparatus to the magnet to restrict displacement of the magnet relative to the Hall sensor;

measuring a first output signal voltage, subsequently to coupling the clamp apparatus to the magnet and concurrently with an absence of applied electrical current, such that the measured first output signal voltage is independent of both magnet displacement and coil assembly magnetic field;

commanding application of electrical current to the coil assembly, concurrently with maintaining the coupling of the clamp apparatus to the magnet;

measuring a current strength of the applied electrical current and a second output signal voltage, concurrently with maintaining the coupling of the clamp apparatus and measuring the current strength of the applied electrical current, such that the measured second output signal voltage is independent of magnet displacement and is based at least in part upon a coil assembly magnetic field which is based at least in part upon the applied electrical current; and estimating the current coefficient, based at least in part upon the measured first output signal voltage, measured second output signal voltage, and measured applied electrical current strength.

8. The method of claim 7, wherein coupling the clamp apparatus to the magnet comprises commanding a clamp actuator to adjustably position the clamp apparatus to couple to the magnet.

9. An apparatus, comprising:

a Lorentz actuator calibration module configured to adjust voltages of output signals, generated by a Hall sensor included in a Lorentz actuator mechanism based on a sensed magnetic field strength, such that the adjusted output signal voltages indicate displacement of a magnet in the Lorentz actuator mechanism, independently of actuator coil magnetic fields generated at an actuator coil in the Lorentz actuator mechanism based on an electrical current applied to the actuator coil, wherein the calibration module comprises:

a coefficient calculator module configured to determine a relationship between a given output signal voltage and a proportion of said output signal voltage associated with an actuator coil magnetic field generated based on a given applied current strength.

10. The apparatus of claim 9, wherein the calibration module comprises a current control module configured to:

command application, to the actuator coil, of electrical current having a time-varying current strength profile which causes a corresponding time-varying displacement profile of the magnet based at least in part upon Lorentz forces generated at the actuator coil;

record, at a plurality of separate instances of elapsed time concurrently with the time-varying displacement profile of the magnet, a plurality of sets of synchronously-measured output signal voltage, applied electrical current strength, and magnet displacement; and estimate, based at least in part upon the recorded plurality of sets of synchronously-measured output signal voltage, applied electrical current strength, and magnet displacement:

an actuator coefficient which represents a determined linear relationship fit between the applied electrical current strength measurements and the magnet displacement measurements, a corrupted signal coefficient which represents a determined linear relationship fit between the output signal voltage measurements and the magnet displacement measurements, a voltage signal offset which represents a determined output signal voltage corresponding with an absence of applied electrical current, and a displacement offset which represents a determined magnet displacement corresponding with an absence of applied electrical current.

11. The apparatus of claim 10, wherein:

the current control module is configured to:

command application of electrical current to the actuator coil, such that the magnet is caused to be displaced from an equilibrium position to a first position;

record a first output signal voltage, concurrently with application of electrical current to the actuator coil and the magnet remaining in a stable displacement at the first position;

command termination of electrical current application to the actuator coil; and record a second output signal voltage subsequent to the termination of electrical current application and prior to a change in the displacement of the magnet from the first position; and the coefficient calculator module is configured to determine a relationship between a given output signal voltage and a proportion of said output signal voltage associated with an actuator coil magnetic field generated based on a given applied current strength, based at least in part upon a ratio of the second output signal voltage to the first output signal voltage, the corrupted signal coefficient, and the actuator coefficient.

12. The apparatus of claim 9, wherein:

the calibration module comprises a displacement control module configured to adjustably control an orientation of a support structure to which the Lorentz actuator mechanism is coupled, such that the magnet is caused to be displaced based at least in part upon the orientation of the support structure and independently of any electrical current applied to the actuator coil;

the coefficient calculator module is configured to determine a relationship between recorded output signal voltages and a proportion of said recorded output signal voltages associated with displacement of the magnet; and to determine a relationship between a given output signal voltage and a proportion of said output signal voltage associated with an actuator coil magnetic field generated based on a given applied current strength, the coefficient calculator module is interoperable with the displacement control module to:

measure a first output signal voltage, concurrently with an absence of electrical current applied to the actuator coil and an absence of magnet displacement, such that the measured first output signal voltage represents an offset voltage independent of both magnet displacement and applied electrical current strength;

adjust an orientation of the support structure, such that the magnet is displaced independently of any electrical current applied to the actuator coil;

measure a magnitude of the magnet displacement and a second output signal voltage, concurrently with maintaining the adjusted orientation, such that the measured second output signal voltage is associated with the magnet displacement and is independent of any applied electrical current strength; and estimate the relationship between measured output signal voltages and a proportion of said output signal voltages associated with magnet displacement independently of any applied electrical current strength, based at least in part upon the measured first output signal voltage, measured second output signal voltage, and measured magnet displacement.

13. The apparatus of claim 9, wherein:

the calibration module comprises a clamp control module configured to adjustably control a clamp apparatus to couple with the magnet, such that the magnet is restricted from being displaced when an electrical current is applied to the actuator coil; and to determine a relationship between a given output signal voltage and a proportion of said output signal voltage associated with an actuator coil magnetic field generated based on a given applied current strength, the coefficient calculator module is interoperable with the clamp control module to:

couple the clamp apparatus to the magnet to restrict displacement of the magnet, relative to the Hall sensor;

measure a first output signal voltage, subsequently to coupling the clamp apparatus to the magnet and concurrently with an absence of electrical current applied to the actuator coil, such that the measured first output signal voltage represents an offset voltage which is independent of both magnet displacement and applied electrical current strength;

command application of electrical current to the actuator coil, concurrently with maintaining the coupling of the clamp apparatus to the magnet;

synchronously measure a second output signal voltage and a current strength of the applied electrical current, concurrently with maintaining the coupling of the clamp apparatus, such that the measured second output signal voltage is independent of magnet displacement and is associated with the current strength of the applied electrical current; and estimate the relationship between output signal voltages and the proportion of said output signal voltages associated with actuator coil magnetic fields generated based on applied electrical currents, based at least in part upon the measured first output signal voltage, measured second output signal voltage, and measured applied electrical current strength.

14. The apparatus of claim 9, wherein the Lorentz actuator calibration module is comprised in a controller device configured to adjustably control electrical current application to the actuator coil to adjustably control displacement of the magnet.

15. A non-transitory computer readable medium comprising a program of instructions, executable by a computer system, which cause the computer system to:

determine a voltage of an output signal generated by a Hall sensor associated with a Lorentz actuator mechanism, wherein the generated output signal voltage is based at least in part upon:

a displacement, relative to the Hall sensor, of a mobile component which comprises a magnet, and a magnetic field generated by a coil element of the actuator mechanism, based at least in part upon an application of an electrical current to the coil element;

determine a portion of the generated output signal voltage which is associated with the magnetic field generated by the coil element, based at least in part upon a current strength of the applied electrical current and a current coefficient which represents a relationship between applied electrical current strength and the portion of the generated output signal voltage which is associated with the magnetic field generated by the coil element; and determine, based at least in part upon the generated output signal voltage and the determined portion of the generated output signal voltage which is associated with the magnetic field generated by the coil element, a displacement of the mobile component from an equilibrium position.

16. The non-transitory computer readable medium of claim 15, wherein the program of instructions, when executed, cause the computer system to:

command application of electrical current having a time-varying current strength profile which causes a corresponding time-varying displacement profile of the mobile component, based at least in part upon Lorentz forces generated at the coil element;

generate a time-varying plurality of sets of synchronously-measured output signal voltage, applied electrical current strength, and mobile component displacement magnitude concurrently with the time-varying displacement profile of the mobile component; and estimate, based at least in part upon the generated time-varying plurality of sets of synchronously-measured output signal voltage, applied electrical current strength, and mobile component displacement magnitude:

an actuator coefficient which represents a determined linear relationship fit between the electrical current strength measurements and the mobile component displacement magnitude measurements, a corrupted signal coefficient which represents a determined linear relationship fit between the output signal voltage measurements and the mobile component displacement magnitude measurements, a voltage offset which represents a determined output signal voltage corresponding with an absence of applied electrical current, and a displacement offset which represents a determined mobile component displacement magnitude corresponding with an absence of applied electrical current.

17. The non-transitory computer readable medium of claim 15, wherein the program of instructions, when executed, cause the computer system to:
command application of electrical current to the coil element, such that the mobile component is caused to be displaced from the equilibrium position to a first position;
record a first output signal voltage, concurrently with application of the electrical current to the coil element and the mobile component remaining in a stable displacement at the first position;
command termination of electrical current application to the coil element;
record a second output signal voltage subsequent to the termination of electrical current application and prior to a change in the displacement of the mobile component from the first position; and
estimate the current coefficient based at least in part upon a ratio of the second voltage signal to the first voltage signal, the corrupted signal coefficient, and an actuator coefficient.

18. The non-transitory computer readable medium of claim 15, wherein the program of instructions, when executed, cause the computer system to:
estimate a displacement coefficient which represents a relationship between the mobile component displacement magnitude and a portion of the generated output signal voltage which is associated with the displacement of the mobile component;
wherein estimating the displacement coefficient comprises:
measuring a first output signal voltage, concurrently with an absence of electrical current applied to the coil element and an absence of mobile component displacement from the equilibrium position,
such that the measured first output signal voltage represents an offset voltage independent of both mobile component displacement and applied electrical current;
causing a displacement of the mobile component independently of application of electrical current to the coil element;
measuring a second output signal voltage and a mobile component displacement magnitude, concurrently with maintaining the displacement, such that the measured second output signal voltage is independent of any magnetic field generated by the coil element; and
estimating the displacement coefficient, based at least in part upon the measured first output signal voltage, measured second output signal voltage, and measured mobile component displacement magnitude.

19. The non-transitory computer readable medium of claim 18, wherein:
the Lorentz actuator mechanism is mounted to a support structure which is configured to be adjusted to a plurality of orientations in at least one dimension; and
causing a displacement of the mobile component comprises commanding an actuator associated with the support structure to adjust the support structure orientation in at least one dimension.

20. The non-transitory computer readable medium of claim 15, wherein the program of instructions, when executed, cause the computer system to:
estimate a magnitude of the current coefficient, wherein the estimating comprises:
coupling a clamp apparatus to the mobile component to restrict displacement of the mobile component, relative to the Hall sensor;
measuring a first output signal voltage, concurrently with maintaining the coupling of the clamp apparatus to the mobile component and concurrently with an absence of electrical current applied to the coil element, such that the measured first output signal voltage represents an offset voltage independent of both mobile component displacement and applied electrical current;
commanding application of electrical current to the coil element, concurrently with maintaining the coupling of the clamp apparatus to the mobile component;
measuring a current strength of the applied electrical current and a second output signal voltage, concurrently with maintaining the coupling of the clamp apparatus and application of the electrical current, such that the measured second output signal voltage is independent of mobile component displacement and is based at least in part upon the applied electrical current strength; and
estimating the current coefficient, based at least in part upon the measured first output signal voltage, measured second output signal voltage, and measured applied electrical current strength.

* * * * *